United States Patent [19]

Hsu et al.

[11] Patent Number: 5,271,357
[45] Date of Patent: Dec. 21, 1993

[54] METHOD OF COMBUSTION FOR DUAL FUEL ENGINE

[75] Inventors: Bertrand D. Hsu; Gregory L. Confer; Zujing Shen, all of Erie; Martin J. Hapeman, Edinboro; Paul L. Flynn, Fairview, all of Pa.

[73] Assignee: General Electric Company, Erie, Pa.

[21] Appl. No.: 825,242

[22] Filed: Jan. 24, 1992

[51] Int. Cl.$^5$ .............................................. F02B 45/00
[52] U.S. Cl. ....................................... 123/23; 123/575
[58] Field of Search .......... 123/1 A, 23, 575, 27 GE, 123/299, 300, 304

[56] References Cited

U.S. PATENT DOCUMENTS

| | | | |
|---|---|---|---|
| 4,266,727 | 5/1981 | Happel et al. | 239/409 |
| 4,335,684 | 9/1983 | Davis | 123/1 A |
| 4,416,229 | 11/1983 | Wood | 123/304 |
| 4,463,719 | 8/1984 | Pischinger | 123/304 |
| 4,481,921 | 11/1984 | Tsukahara | 123/304 |
| 4,499,862 | 2/1985 | Bäumer | 123/304 |
| 4,612,898 | 9/1986 | Steiger et al. | 123/299 |
| 4,621,599 | 11/1986 | Igashira | 123/299 |
| 4,699,103 | 10/1987 | Tsukahara | 123/304 |
| 4,700,672 | 10/1987 | Baguena | 123/299 |
| 4,736,712 | 4/1988 | Saukar | 123/575 |
| 4,742,801 | 5/1988 | Kelgard | 123/27 GE |
| 4,782,794 | 11/1988 | Hsu et al. | 123/23 |
| 4,825,842 | 2/1989 | Steiger | 123/575 |
| 4,834,055 | 5/1989 | Steiger | 123/300 |
| 4,864,990 | 9/1989 | Tateishi et al. | 123/27 GE |
| 5,050,555 | 9/1991 | Gao | 123/304 |
| 5,056,469 | 10/1991 | Kimberley | 123/23 |

FOREIGN PATENT DOCUMENTS 124642 3/1919 United Kingdom .

OTHER PUBLICATIONS

Heat Transfer in the Cylinder of Reciprocating Internal Combustion Engines, W. J. D. Annand, 1963.
Micronized Coal Water Slurry Sprays from a Diesel Engine Positive Displacement Fuel Injection System, Jerald A. Canton et al., Apr. 21-24, 1991.
Coal Fueled Diesel Engine Progress at GE Transportation Systems, P. L. Flynn et al., Jul. 1990.
Heat Release, Cycle Efficiency and Maximum Cylinder Pressure in Diesel Engine—The Use of an Extended Air Cycle Analysis, B. D. Hsu, 1984.
Progress on the Investigation of Coal-Water Slurry Fuel Combustion in a Medium Speed Diesel Engine, Part 1—Ignition Studies, B. D. Hsu, 1988.
Progress on the Investigation of Coal-Water Slurry Fuel Combustion in a Medium Speed Diesel Engine, Part 2—Preliminary Full Load Test, B. D. Hsu, 1988.
Progress on the Investigation of Coal-Water Slurry Fuel in a Medium-Speed Diesel Engine, Part 3—Accumulator Injector Performance, B. D. Hsu et al., 1989.
Ignition and Combustion of Coal-Water Slurry in a Confined Turbulent Diffusion Flame, P. M. Walsh et al., 1984.
Simulation of Significant Design and Operating Characteristics of a Coal Fueled Locomotive Diesel Engine, S. Wahiduzzaman et al., 1991.

*Primary Examiner*—Tony M. Argenbright
*Assistant Examiner*—Erick Solis
*Attorney, Agent, or Firm*—R. Thomas Payne

[57] ABSTRACT

Apparatus and a method of introducing a primary fuel, which may be a coal water slutty, and a high combustion auxiliary fuel, which may be a conventional diesel oil, into an internal combustion diesel engine comprises detecting the load conditions of the engine, determining the amount of time prior to the top dead center position of the piston to inject the main fuel into the combustion chamber, and determining the relationship of the timing of the injection of the auxiliary fuel into the combustion chamber to achieve a predetermined specific fuel consumption, a predetermined combustion efficiency, and a predetermined peak cylinder firing pressure.

23 Claims, 18 Drawing Sheets

Fig. 7
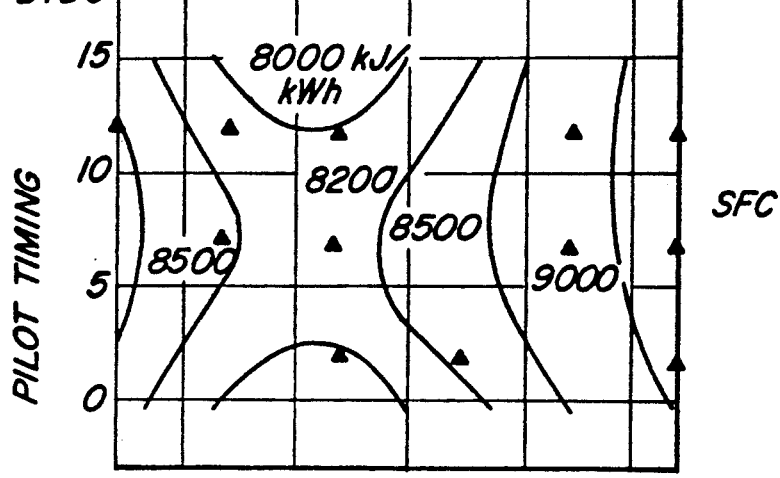
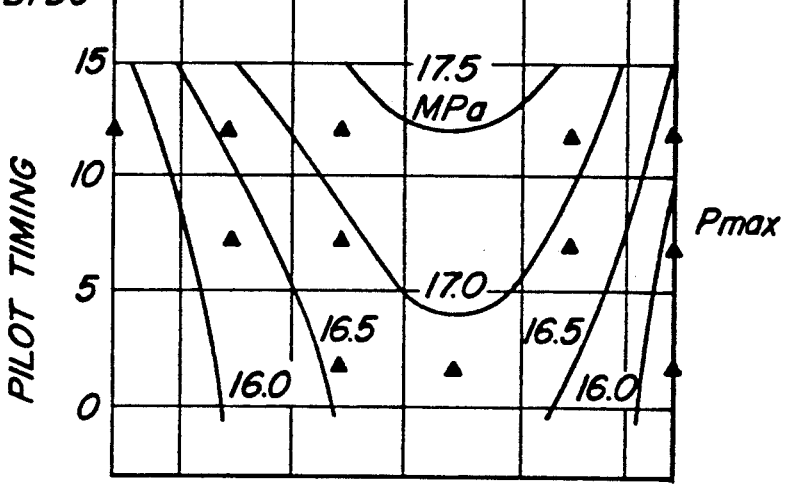
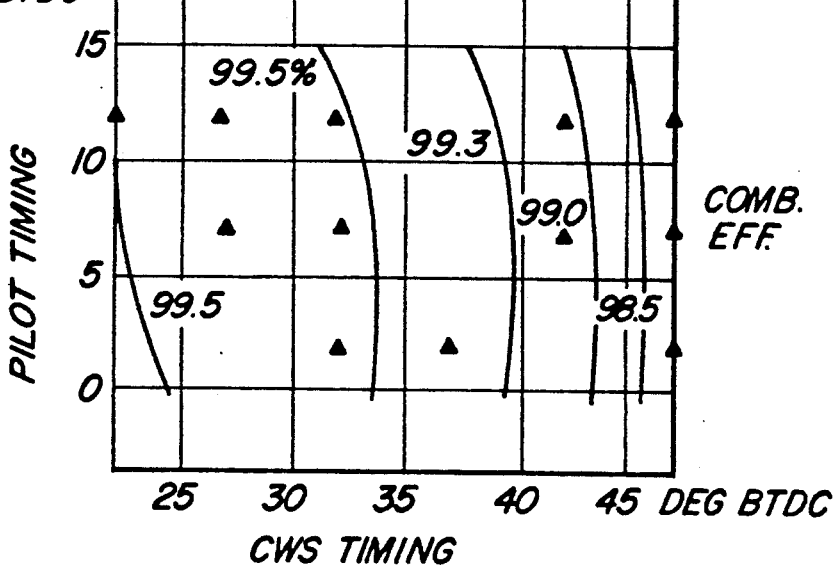

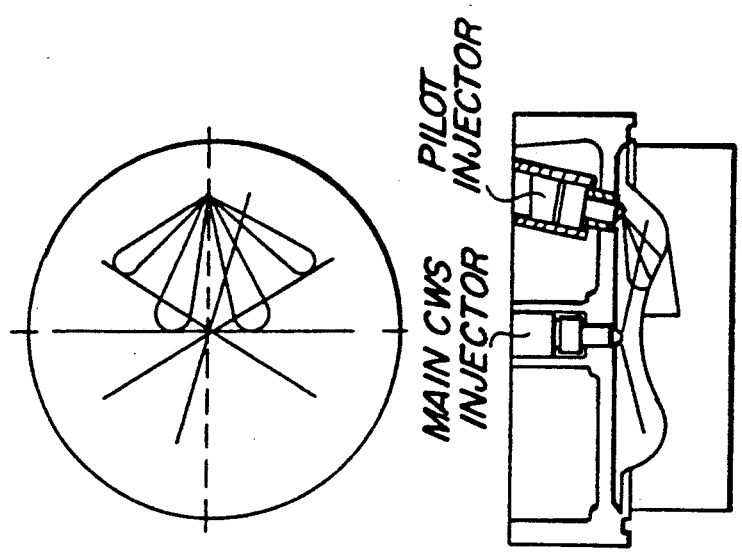
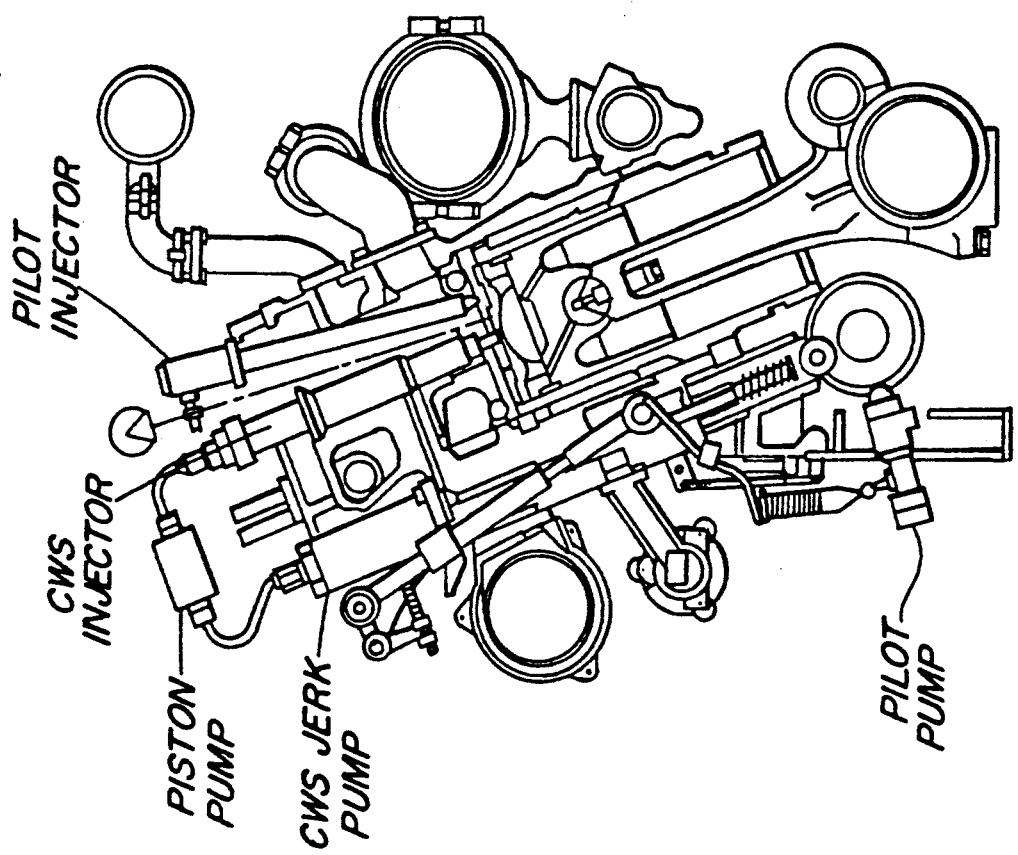
Fig. 17

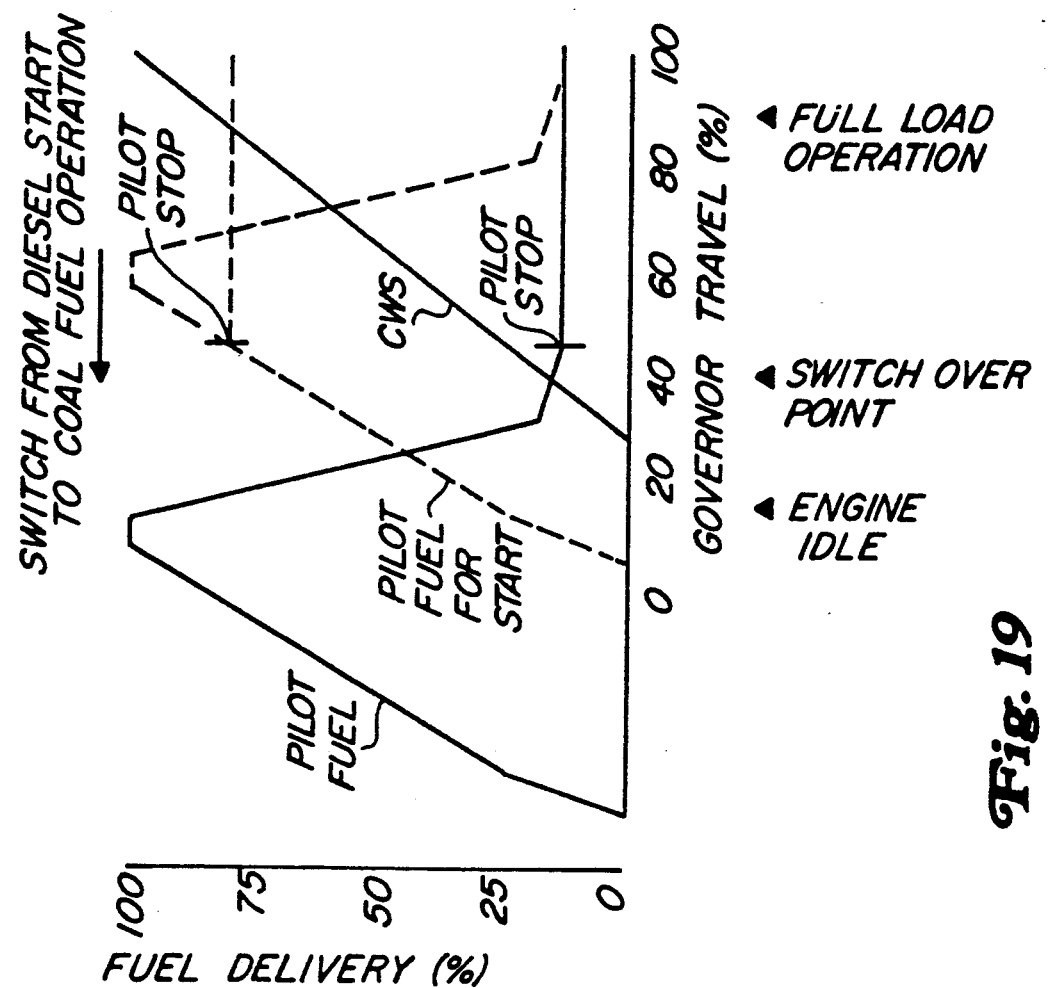
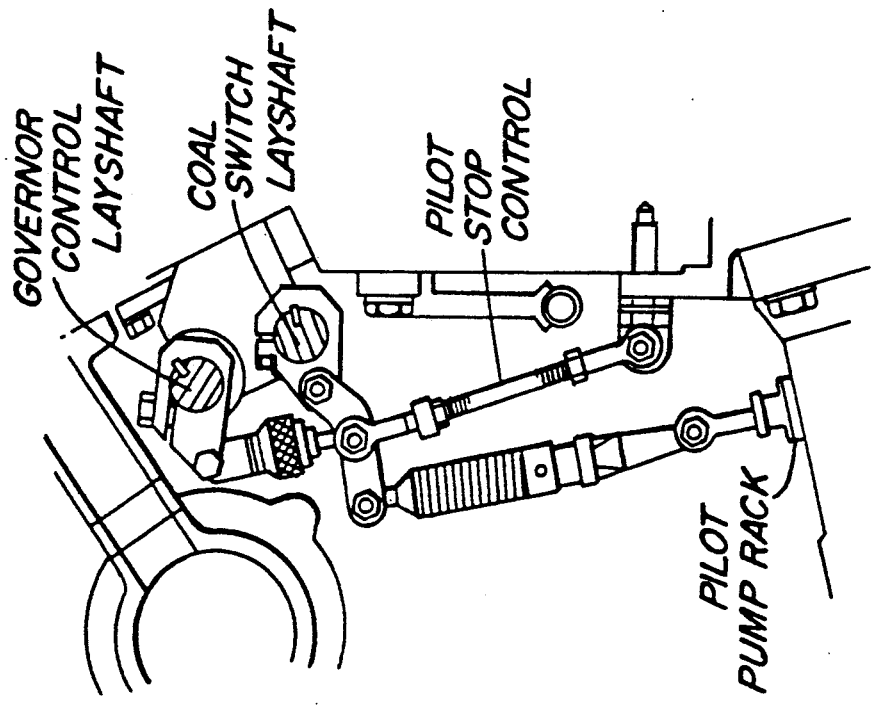
Fig. 19

METHOD OF COMBUSTION FOR DUAL FUEL ENGINE

GOVERNMENT INVENTION

The invention was made with support of the Government of the United States of America under contract DE-A21-85MC22181 awarded by the Department of Energy. The Government has certain rights in this invention and in any resulting patent, particularly to a system for injection fine particles of coal mixed with water into the cylinders of a diesel engine.

BACKGROUND OF THE INVENTION

Diesel engines efficiently convert the latent heat of hydrocarbon fuel into useful mechanical power. In operation of conventional diesel engines, a metered amount of fuel is injected into each cylinder of the engine at recurrent intervals synchronized with rotation of the engine crankshaft to coincide with the air-compression stroke of a reciprocating piston. As pressure increases, the compression temperature in the cylinder rises and the injected fuel is soon hot enough to ignite. The resulting combustion or firing of fuel in the cylinder forces the piston to move in the opposite direction, thereby applying torque to the engine crankshaft.

Conventional engine fuel is a relatively low grade, refined petroleum known generally as diesel fuel oil which has desirable ignition and heat release characteristics. Diesel fuel oil has acceptably low levels of corrosive, abrasive and other noxious matter, and it is in ample supply at the present time.

For nearly a century persons skilled in this art have known that coal, in the form of either a dry powder or a liquid slurry (i.e., a mixture of pulverized coal or other form of carbon dust and a liquid carrier such as oil or water), is an alternative fuel for diesel engines. Interest in developing a practical coal-fueled diesel engine has varied over the years directly with the cost and inversely with the supply of standard diesel fuel oil. For a review of such development efforts, see the article entitled "Slow-Speed Two-Stroke Diesel Engine Tests Using Coal-Based Fuels" by J. P. Davis, J. B. Dunlay, M. K. Eberle, and H. A. Steiger, published in 1981 as paper No. 81-DGP-12 by the American Society of Mechanical Engineers (New York, N.Y., U.S.A.).

The injection of a coal-water slurry (hereinafter sometimes referred to as "CWS") into a compression ignition reciprocating internal combustion engine such as a large, medium-speed, multi cylinder diesel engine, poses problems not typically encountered in the injection of pure liquid fuels. One problem is that CWS does not ignite as readily as conventional diesel fuel because it has a relatively long ignition delay time, because there are practical limits to the degree of atomization of CWS that can be obtained, and because there are practical limits in the amount that the inlet air temperature and the compression temperature of the engine cylinders can be increased compared to diesel engines using standard diesel fuel oil as their primary fuel.

More than 65 years ago it was recognized that a small amount of readily ignitable pilot fuel could be injected in diesel engines to improve combustion of "heavy" hydrocarbon fuels that are otherwise difficult to ignite. See British Patent No. 124,642. As used herein, the term "pilot fuel" means relatively light hydrocarbon fuel (e.g. methanol or even standard diesel fuel oil) characterized by being significantly easier to ignite than the primary fuel in the injection system.

U.S. Pat. No. 4,825,842 disclosed a fuel injection system for an internal combustion engine in which diesel oil was injected as an ignition fuel and in which CWS was injected as a primary fuel. That patent discloses an apparatus which permits the use of diesel fuel either as a pilot fuel for CWS, or as the sole fuel for the engine. It does not, however, address the issue of the timing of injection of the primary CWS fuel and the ignition fuel, and it does not address the optimization of fuel efficiency, emission control and maximum cylinder pressure using those fuels.

U.S. Pat. No. 4,612,898 discloses a cylinder head for a piston internal combustion engine having two fuel injection nozzles, one of which is used to inject an ignition fuel and the other of which is used to inject a main, non-self-igniting fuel. It does not, however, address the issue of the timing of injection of the primary CWS fuel and the ignition fuel, and it does not address the optimization of fuel efficiency, emission control and maximum cylinder pressure using those fuels.

U.S. Pat. No. 4,700,672 discloses a two fuel injector apparatus for an internal combustion engine which may be used for a main fuel which is a liquid or gaseous fuel and a pilot fuel. It teaches that the pilot fuel may be injected simultaneously with the main fuel. It does not, however, address the issue of the timing of injection of a primary CWS fuel and an ignition fuel, and it does not address the optimization of fuel efficiency, emission control and maximum cylinder pressure using those fuels.

U.S. Pat. No. 4,782,794 to Hsu et al disclosed that a small amount of readily ignitable pilot fuel could be injected prior to the injection of CWS to aid the combustion of the CWS fuel in a coal-fueled diesel engine. It suggested that the pilot fuel could be introduced by mixing it with the CWS in the fuel supply tank; or a separate pilot fuel injector could be used (U.S. Pat. No. 4,335,684); or the pilot and main injectors could be combined in one coaxial assembly (see U.S. Pat. No. 4,266,727). It also suggested that fuel costs would be saved (assuming that CWS fuel is less expensive than pilot fuel) by injecting the smallest amount of pilot fuel consistent with timely ignition of the CWS fuel.

U.S. Pat. No. 4,782,794 to Hsu also discloses a fuel injection system particularly adapted for injecting coal slurry fuels at high pressures includes an accumulator-type fuel injector which utilizes high-pressure pilot fuel as a purging fluid to prevent hard particles in the fuel from impeding the opening and closing movement of a needle valve, and as a hydraulic medium to hold the needle valve in its closed position. A fluid passage in the injector delivers an appropriately small amount of the ignition-aiding pilot fuel to an appropriate region of a chamber in the injector's nozzle so that at the beginning of each injection interval the first stratum of fuel to be discharged consists essentially of pilot fuel and thereafter mostly slurry fuel is injected.

Several articles that are of some general interest in the general subject matter of diesel engines or in the use of CWS fuel in combustion engines are listed below:

Annand, W. J. D., "Heat Transfer in the Cylinder of Reciprocating Internal Combustion Engines," Proc. Instn. Mech. Engrs., Vol. 177, No. 36, 1963.

Caton, J. A., Kihm, K. D., Seshadri, A. K. and Zicterman, G., "Micronized Coal Water Slurry Sprays from a Diesel Engine Positive Displacement Fuel Injection System," Presented to the Combustion Institute, Central States Section, 1991 Spring Technical Meeting, Nashville, Tenn., April, 1991 (hereinafter "[Caton, 1991]").

Flynn, P. L., Hsu, B. D., and Leonard, G. L., "Coal Fueled Diesel Engine Progress at GE Transportation Systems," ASME Publication, Journal of Engineering for Gas Turbines and Power, Vol. 112, No. 3, 1990, pp. 369-375 (hereinafter "[Flynn et al, 1990]").

Hsu, B. D., "Heat Release, Cycle Efficiency and Maximum Cylinder Pressure in Diesel Engine—The Use of an Extended Air Cycle Analysis," S. A. E. Transactions, 1984, p. 4.766 (herinafter "[Hsu 1984]").

Hsu, B. D., "Progress on the Investigation of Coal-Water Slurry Fuel in a Medium Speed Diesel Engine: Part 1—Ignition Studies," ASME Transactions, Journal of Engineering for Gas Turbines and Power, Vol. 110, No. 3, 1988, pp. 415-422 (hereinafter "[Hsu 1988a]").

Hsu, B. D., "Progress on the Investigation of Coal-Water Slurry Fuel in a Medium Speed Diesel Engine: Part 2—Preliminary Full Load Test," ASME Transactions, Journal of Engineering for Gas Turbines and Power, Vol. 110, No. 3, 1988, pp. 423-430 (hereinafter "[Hsu 1988b]").

Hsu, B. D., Leonard, G. L., and Johnson, R. N., "Progress on the Investigation of Coal-Water Slurry Fuel in a Medium Speed Diesel Engine: Part 3—Accumulator Injector Performance," ASME Transactions, Journal of Engineering for Gas Turbines and Power, Vol. 111, No. 3, 1989, pp. 516-520 (herinafter "[Hsu et al 1989]").

Hsu, B. D. and Confer, G. L., "Progress on the Investigation of Coal-Water Slurry Fuel Combustion in a Medium Speed Diesel Engine: Part 4—Fuels Effect," ASME Publication, Coal Fueled Diesel Engines, ICE Vol. 14, 1991 (herinafter "[Hsu 1991]").

Kanury, A. M., Introduction to Combustion Phenomena, Gordon and Breach Science Publishers, second edition, 1977 (hereinafter "[Kanury, 1975]").

Wahiduzzaman, S., Blumberg, P. N. and Hsu, B. D., "Simulation of Significant Design and Operating Characteristics of a Coal Fueled Locomotive Diesel Engine," ASME Publication, Coal Fueled Diesel Engines, ICE Vol. 14, 1991 (herinafter "[Wahiduzzaman 1991]").

Walsh, P. M., Zhang, M., Farmayan, W. F., Beer, J. M., "Ignition and Combustion of Coal-Water Slurry in a Confined Turbulent Diffusion Flame," presented at the 20th International Symposium on Combustion, Ann Arbor, Mich., Aug. 1984.

The following methods of igniting CWS in a diesel engine were discussed in Hsu, B. D., "Progress on the Investigation of Coal-Water Slurry Fuel in a Medium Speed Diesel Engine: Part 1—Ignition Studies," ASME Transactions, *Journal of Engineering for Gas Turbines and Power*, Vol. 110, No. 3, 1988, pp. 415-422. (hereinafter "[Hsu 1988a]"):

Compression ignition, in which CWS is ignited solely by the compression temperature generated inside the engine cylinder;

Separate pilot diesel fuel injection, in which a separate pilot injector was used to supply a small amount of pure diesel fuel to ignite the CWS which was injected through the main injector (using two separate injectors); and, Stratified pilot fuel ignition, in which a small amount of diesel fuel is delivered to the cylinder through the main fuel injector where the first part of the fuel discharged from the injector consisted essentially of diesel fuel, followed by mostly CWS. Where pilot fuel was used, it was injected prior to the injection of the CWS fuel to aid ignition of the CWS fuel.

The Hsu 1988a article described ignition studies of CWS fuel in a medium speed diesel engine in which the CWS fuel and pilot fuel were separately injected into the combustion chamber using separate injection systems. All of the tests were conducted under low load conditions. In the tests described in that article, the pilot fuel was injected either before the CWS fuel or at or near the beginning of the injection of the CWS fuel under low load conditions.

In tests reported in [Hsu 1988a] and in [Flynn et al., 1990], preliminary success was obtained with a converted mechanical fuel injection equipment (FIE) 12 cylinder engine burning mostly coal slurry fuel. However, the mechanical fuel injection equipment used by that engine could provide only about 95% combustion efficiency, and had to use high percentage of diesel pilot fuel. Hsu, B. D., "Progress on the Investigation of Coal-Water Slurry Fuel in a Medium Speed Diesel Engine: Part 2—Preliminary Full Load Test," ASME Transactions, *Journal of Engineering for Gas Turbines and Power*, Vol. 110, No. 3, 1988, pp. 423-430. Flynn, P. L., Hsu, B. D., and Leonard, G. L., "Coal Fueled Diesel Engine Progress at GE Transportation Systems," ASME Publication, *Journal of Engineering for Gas Turbines and Power*, Vol. 112, No. 3, 1990, pp. 369-375 (hereinafter "[Flynn et al., 1990]").

In a previous paper published by Hsu [1988a], it was pointed out that when pilot fuel is used to ignite CWS fuel under low or minimum load ignition conditions, the starting time of combustion of the CWS fuel is dictated by the start of pilot fuel ignition.

As reported earlier in Hsu, B. D., Leonard, G. L., and Johnson, R. N., "Progress on the Investigation of Coal-Water Slurry Fuel in a Medium Speed Diesel Engine: Part 3—Accumulator Injector Performance," ASME Transactions, Journal of Engineering for Gas Turbines and Power, Vol. 111, No. 3, 1989, pp. 516-520 (hereinafter "[Hsu 1989]"), a high pressure electronically controlled accumulator injector using a diamond compact insert nozzle [Flynn et al., 1990] was developed. The improved reliability and durability of this new FIE allowed for an improved and more thorough study of combustion of CWS fuel in a diesel engine. It was decided to include a diesel pilot fuel injector in the combustion system mainly due to engine start and low load operation needs. As a result, the experimental combustion study was very much facilitated due to the ability of changing pilot/CWS injection timings and quantities without having to stop the engine. Other parameters studied included combustion chamber configuration (by changing CWS fuel injector nozzle hole number/shape/angle), as well as injection pressure.

As the result of extensive testing, it has been determined that relatively small amounts of diesel fuel may be introduced into the combustion chamber prior to CWS fuel at minimum load conditions as a pilot fuel to ignite CWS fuel. Under mid-range to maximum load conditions, however, injection of the same amount of diesel fuel in the conventional way as a pilot fuel before the injection of CWS fuel does not make the CWS fuel burn in a timely and clean manner. Although it might be possible to introduce a large amount of diesel fuel to achieve timely and clean combustion of the CWS fuel, that would partially defeat the purpose of using the less expensive CWS fuel to run the engine.

SUMMARY OF THE INVENTION

It is an object of this invention to cleanly and efficiently burn CWS fuel in a diesel engine.

It is a further object of this invention to develop a two fuel system in which CWS is the primary fuel and in which a relatively small amount of a readily combustible fuel, such as conventional diesel fuel, is used as an auxiliary fuel to achieve timely and complete combustion of the CWS fuel.

It is a further objective to maximize combustion efficiency (or carbon burnout), while maintaining tolerable peak cylinder firing pressure (Pmax), and reasonable specific fuel consumption (SFC). High combustion efficiency is needed mainly for emissions control, although it has some effect also on SFC. It was previously found that due to the heat release concentration, or high relative cycle efficiency [Hsu, 1984] of the coal fuel diesel combustion, it is necessary to limit the Pmax [Hsu, 1988b]. Low engine SFC depends on high relative cycle efficiency and high combustion efficiency. However, high relative cycle efficiency usually brings high Pmax. Thus, it is an object of this invention to obtain a compromise solution to prevent engine hardware mechanical failure.

Another object of this invention is to provide a fuel injection and control system that permits a turbocharged compression ignition engine to start and run at low power levels on diesel oil and then to transition to coal water slurry or other hard to ignite fuels when the turbocharger can supply the inlet temperature and pressure conditions necessary for ignition. The fuel injection system consists of two parts: (1) an auxiliary diesel oil system, and (2) a full load coal water slurry system. The engine would start, idle and run at low loads on the auxiliary diesel fuel system alone. When the load level necessary to achieve coal combustion is reached, the coal water slurry injection will be activated and phased in and the auxiliary diesel oil phased out as a function of load.

In the preferred embodiment of the invention, two fuel systems are used in a diesel engine: a main fuel system and an auxiliary fuel system. The main fuel system uses CWS fuel. The auxiliary fuel system uses an easily ignitable fuel, such as conventional diesel fuel. Most of the fuel used to run the engine is the CWS fuel, which is less expensive than the auxiliary fuel. The auxiliary fuel is used as either a combustion igniter or a combustion enhancer, depending on the load conditions of the engine. The load conditions of the engine are detected by conventional detecting means known to those skilled in the art.

In a preferred embodiment of the invention, a primary fuel and a high combustion auxiliary fuel are separately injected into the combustion chambers of an internal combustion engine. The timing of the injection of each of the two fuels depends upon the load conditions of the engine. Thus, the load conditions are determined first, prior to determining the timing of the injection of the two fuels. Under given load condition, a determination is made as to the amount of time prior to the top dead center position of the piston to inject the main fuel into the combustion chamber. The relationship of the timing of the injection of the auxiliary fuel into the combustion chamber is also determined to achieve a predetermined specific fuel consumption, a predetermined combustion efficiency, and a predetermined peak cylinder firing pressure.

In one example of the invention, a two fuel system for a for a multicylinder diesel locomotive engine comprises a primary (or main) fuel, which is a coal water slurry, and an auxiliary fuel, which is a highly combustible fuel such as conventional diesel oil. The auxiliary fuel is used to start the locomotive engine and to run the engine at idle conditions or no load conditions to warm up the engines. When the engine is used to move the locomotive, i.e., when the engine is placed under load, the load conditions on the engine are detected or determined, and at minimum load conditions (above engine idle or above no load conditions), the auxiliary fuel is introduced into the combustion chambers as a pilot fuel prior to introducing the main fuel into the combustion chambers. At midrange load conditions, the amount of time required for a predetermined amount of evaporation and devolatilization of the main fuel under the load conditions is determined and the main fuel is introduced into the combustion chambers sufficiently prior to the top dead center position of the piston to achieve the predetermined amount of evaporation and devolatilization. The introduction of the auxiliary fuel into the combustion chambers is delayed relative to the introduction at minimum load conditions for a predetermined amount of time so that the main fuel can be ignited and burn very fast to yield a predetermined high combustion rate and efficiency. At maximum load conditions the amount of time required for a predetermined amount of evaporation and devolatilization of the main fuel is determined. The main fuel is introduced sufficiently prior to the top dead center position of the piston to achieve the predetermined amount of evaporation and devolatilization. The introduction of the auxiliary fuel into the combustion chambers is delayed until a predetermined amount of time after introduction of the main fuel has occurred so that the main fuel has evaporated and so that the main fuel will burn very fast to yield a predetermined high combustion rate and efficiency at a predetermined maximum cylinder pressure. Thus, in some cases, at maximum load conditions, the main fuel will self ignite prior to the introduction of the auxiliary fuel and the auxiliary fuel will act as a combustion enhancer, rather than as a pilot fuel.

The coal water slurry may comprise from about 0.7% to about 2.5% ash and the solid loading of the slurry may comprises from about 47% to about 49% by weight.

Also, in a preferred embodiment of the invention, a separate, independent auxiliary fuel injection system is provided to start and run the engine at low load on a readily combustible fuel, such as conventional diesel oil, and another independent primary fuel injection system is provided to inject less combustible fuel, such as CWS, once the engine reaches normal operating conditions. Throttle means are provided to select the load under which the engine operates. Sensing means, such as a transducer, are disposed in operative communication with the cylinder, either directly or through other parts of the engine, to determine the operating condition of the engine. Control means responsive to the sensing means and throttle means, such as an electronic circuit or other commonly known computer controls are in communication with the auxiliary fuel injection system and the primary fuel injection system and selects the amount of CWS fuel and diesel fuel to be injected into the engine cylinders and the timing of their respective deliveries in accordance with the method described above.

BRIEF DESCRIPTION OF THE DRAWINGS

FIG. 7 is a chart showing an injection timing map at full engine load;

FIG. 17 is a diagram of one example of a 12 cylinder coal fueled diesel engine layout;

DETAILED DESCRIPTION

Figure 1:
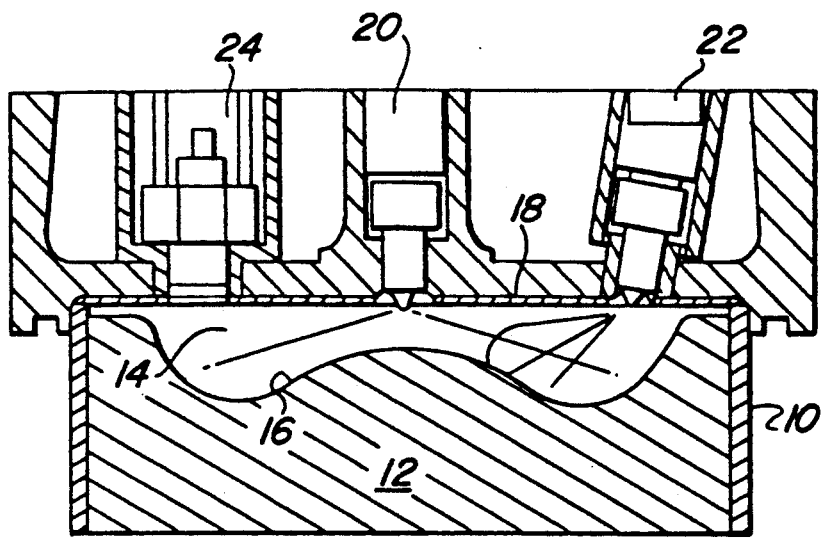
FIG. 1 is a diagrammatic view of a combustion chamber having separate injectors for the CWS fuel and the auxiliary fuel.

FIG. 1 is a diagram depicting the components of a typical combustion chamber of a multicylinder diesel engine that are relevant to this invention. Cylinder 10 of the combustion engine houses a reciprocating piston 12 which is operatively connected to a crankshaft (not shown) as is well known those skilled in the art. The combustion chamber 14 of the cylinder 10 consists of the area in the cylinder between the top 16 of the piston 12 and below the cylinder head 18.

Cylinder 10 is provided with means for introducing the main fuel into the cylinder, which may comprise a main fuel injector 20, which may be made in accordance with the invention previously disclosed in U.S. Pat. No. 4,782,794 to Hsu. That fuel injection system was particularly adapted for injecting coal slurry fuels at high pressures and includes an accumulator-type fuel injector which utilizes high-pressure pilot fuel as a purging fluid to prevent hard particles in the fuel from impeding the opening and closing movement of a needle valve, and as a hydraulic medium to hold the needle valve in its closed position.

Cylinder 10 is also provided with a separate means for introducing the auxiliary fuel into the cylinder, independent of the main fuel, which may consist of an auxiliary fuel injector 22, such as any conventional diesel fuel injectors which are well known to those in the art.

Cylinder 10 may also be provided with detecting means, such as a transducer, for detecting the pressure and/or temperature conditions of the cylinder.

As is known to those in the art, conventional diesel engines typically have a crankshaft mechanically coupled to a variable load such as the rotor of an alternating current generator that supplies electric power to an electric load circuit. The power output of the generator and hence the load imposed on the engine crankshaft is limited by a regulator. The engine typically has multiple sets of two cylinders in which reciprocating pistons are respectively disposed, the pistons being respectively connected via rods and journals to individual eccentrics or cranks of the crankshaft. In a typical medium speed 4,000-horsepower engine, there are 16 cylinders, the cylinder bore is approximately nine inches, and the compression ratio is of the order of 12. Each cylinder has air inlet and exhaust valves (not shown) that are controlled by associated cams on the engine camshaft which is mechanically driven by the crankshaft In a 4-stroke engine, the camshaft turns once per two full revolutions of the crankshaft, and therefore 2:1 speed reducing gearing is provided.

As was disclosed in U.S. Pat. No. 4,782,794 to Hsu, the amount of CWM fuel discharged into each cylinder during each injection interval varies with the angular position of a fuel control shaft connected via a parallel array of cranks to adjusting rods of a family of fuel pumps that are individually associated with the respective injectors. The fuel control shaft is coupled by a linkage to suitable actuating means for turning it to the desired position, as indicated by the value "X" of a variable electrical input signal supplied to the actuator by control means.

In one embodiment of this invention, a multi-cylinder diesel engine has cylinders having a 229 mm bore, a 267 mm stroke and a rated speed of 1050 rpm. The combustion chamber 14 has a side mounted pilot diesel fuel injector 20 and a centrally placed CWS main fuel injector 22. The pilot fuel injection system and the main CWS fuel injection systems are conventional systems known to those skilled in diesel engine systems and are controlled by conventional electronic control systems, also known to those skilled in diesel engine systems. The injection timings and quantities can be varied by those systems in accordance with the invention described below.

One example of CWS fuel which may be used in practicing this invention was coal cleaned to 0.8% ash as shown in Table 1. The solid loading of the slurry used was maintained at about 49% by weight. It is also possible to use CWS fuel having a range of 0.7% ash to 2.5% ash. The slurry may be varied from about 46% to about 51% by weight, but preferably is in the range of about 47% to 49% by weight.

TABLE 1

| Analysis of Coal Used in Coal Water Slurry | | | |
|---|---|---|---|
| Proximate Analysis | | Ultimate Analysis | |
| % Ash | 0.80 | % Carbon | 82.59 |
| % Volatile | 39.40 | % Hydrogen | 5.34 |

TABLE 1-continued

| Analysis of Coal Used in Coal Water Slurry | | | |
|---|---|---|---|
| % Fixed Carbon | 59.80 | % Nitrogen | 2.08 |
| Particle Size | | % Chlorine | 0.18 |
| Mass Mean Diameter (microns) | 5.47 | % Sulfur | 1.01 |
| | | % Oxygen (diff.) | 8.00 |
| Heating Value | | High Heating Value (kJ/kg) | 34630 |

Figure 2:
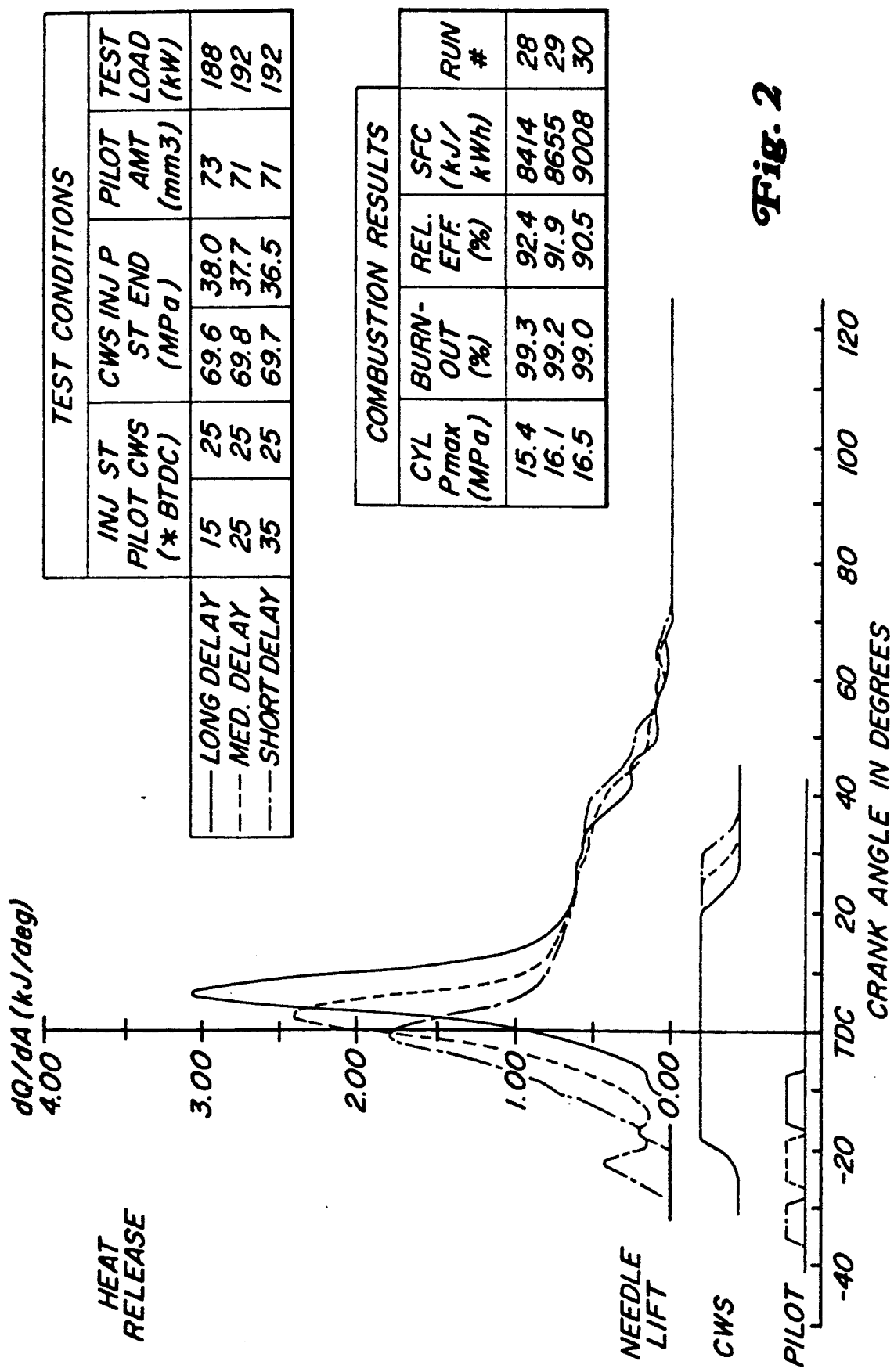
FIG. 2 is a graph and table showing a combustion analysis of a dual fuel engine under full engine load for three separate sets of conditions.

FIG. 2 shows the combustion analysis of three runs under engine full load conditions (high inlet air temperature and pressure) using the same CWS fuel injection timing of 25 deg BTDC while varying the pilot fuel timing from 35, 25 to 15 deg before top dead center (BTDC). As already proven by previous work, the first small peak on the heat release trace corresponds to the combustion of the pilot fuel. The start of the rise of the heat release trace that follows immediately afterwards indicates the start of combustion, or ignition, of the CWS fuel. It is clearly seen that the overall start of combustion in the engine depended on the pilot fuel timing. It is also seen that, although the CWS fuel was injected at the same timing, the CWS fuel residence time before coal ignition (from the start of CWS injection to coal ignition time characterized by the start of the second rise of the heat release curve) depended on the pilot fuel timing.

Figure 3:
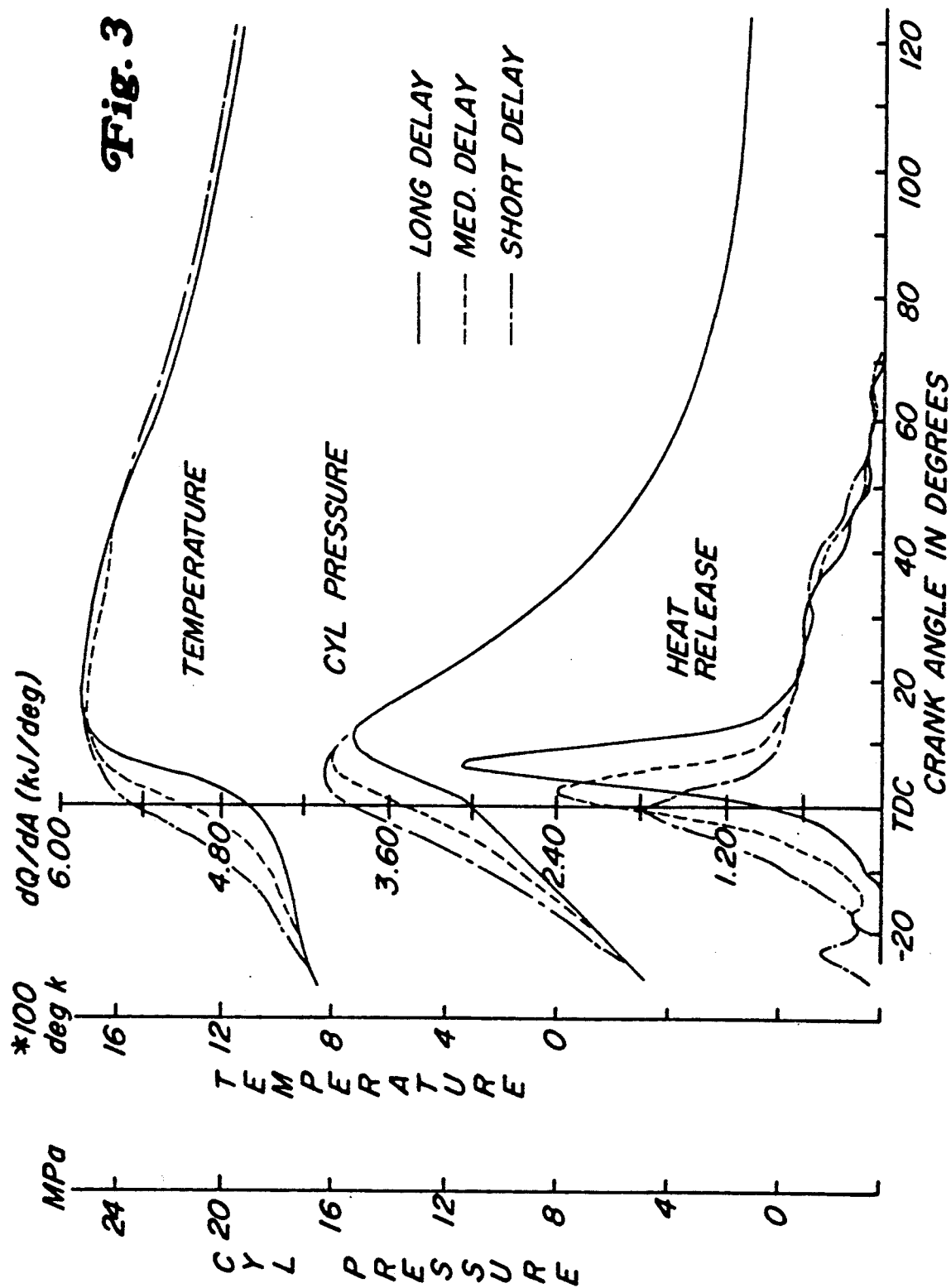
FIG. 3 is a graph showing the cylinder temperature and pressure for the combustion conditions set forth in FIG. 2.

In the right side upper table in FIG. 2, the test conditions are listed. In the lower table of "Combustion Results", the criteria set forth to investigate combustion in this study (Pmax, combustion efficiency, and SFC) are listed. The run with 15 deg pilot injection timing had the most favorable combustion. It had the lowest Pmax, highest combustion efficiency, and lowest SFC. Some of the results can find explanation from the heat release traces. The highest Pmax (35 deg BTDC pilot timing case) was caused by the large amount of fuel burning BTDC. Fuel burned BTDC has a predominant effect on Pmax than that burned after TDC (ATDC) [Hsu, 1984]. The lowest SFC (15 deg BTDC pilot timing case) can be explained by the concentrated fuel combustion close to TDC, as indicated by the highest "Relative Cycle Efficiency" of 92.4% listed in the same table. The effect of the latter has also been explained by Hsu [1984]. In FIG. 3, the cylinder pressure and temperature are plotted together with the heat release rate. The case of 15 deg BTDC pilot timing produced the highest maximum temperature occurring at about the end of the heat release period (30 –40 deg ATDC), which probably contributed to the highest combustion efficiency obtained.

The difference in the shape of the three heat release traces is believed to be caused by the variance of CW fuel residence time before coal ignition, which is shown in Table 2. The residence time of CWS before ignition appears somewhat like the "ignition delay" for diesel fuel. However, the processes involved are very different. With normal diesel fuel operation, during the ignition delay period, both a physical evaporation process and a chemical kinetic reaction process take place (mainly the latter which depends on the fuel cetane number). For CWS fuel, the residence time is mainly needed for water evaporation. This is observed both in an engine study [Hsu, 1988a] and a furnace study [Walch et al., 1984]. The amount of dehydrated coal fuel that can be burned at ignition time depends on the amount of water evaporated at that instant. Clearly, the longer residence time the CWS fuel has in the cylinder before ignition, the more water is evaporated by the heat in the cylinder. Thus, more dehydrated coal is released for combustion immediately after ignition. Hence, a very high concentrated heat release rate could appear. On the other hand, it should be pointed out that when pilot fuel is injected early and starts to burn, the average cylinder temperature becomes higher at an earlier time, which can also accelerate evaporation. This can be seen for the three cases in FIG. 3 and the average gas temperatures in the cylinder during coal residence time before ignition are listed in Table 2 as well (both in crank angle degree and absolute time scales). However, the higher temperature has less effect on evaporation than the residence time. This can be explained, on one hand, by the simplified basic droplet evaporation relationship as follows [Kanury, 1975]:

$$dW = k1 * ln(k2 * Tcyl + C)$$

dW—increment of evaporated water mass
dt—time increment
Tcyl—in cylinder temperature
k1—f(droplet diameter, thermal diffusivity, density)
k2—f(specific heat, latent heat)
C—f(specific heat, latent heat, droplet temperature)

In the above formula, it is seen that the in-cylinder temperature affects the evaporation mass in the exponential term, whereas, the residence time has a direct proportional effect. On the other hand, Table 2 indicates that the difference in average gas temperature for the three cases is very small (from 940 to 920K, about 2%). However, the order of magnitude of change in the residence time available for evaporation is significantly greater (from 0.95 to 2.38 msec, about 250%). Thus, due to having the most amount of available dehydrated coal fuel at ignition, the case of 15 deg pilot injection producing the highest and most concentrated heat release rate is understood.

TABLE 2

| Residence Time and Average Temperature Before Ignition | | |
|---|---|---|
| Pilot Fuel Timing Deg BTDC | CWS Fuel Res Time Deg CA (msec) | Avg Cyl Gas Temp Deg K |
| 35 | 6 (0.95) | 940 |
| 25 | 11 (1.74) | 930 |
| 15 | 15 (2.38) | 920 |

From the above analysis, it is seen that CWS fuel can be ignited by pilot fuel anytime after being injected into the engine cylinder. However, the best combustion result was obtained by delaying the ignition as much as possible, as in the 15 deg pilot injection case. This can be appropriately named the "Delayed Ignition" case. In fact, the computer combustion model study under our general research contract also suggested the CWS fuel be injected highly in advance of the pilot fuel [Wahiduzzaman et al., 1991]. In the engine tests, it was also found that when pilot injection was further retarded, self ignition of CWS occurred, which was the limit of "Delayed Ignition". In such instances, pilot fuel no longer ignited the coal fuel, but rather enhanced combustion after coal self ignition. No detrimental effect on combustion or engine performance was observed for these cases either.

Figure 4:
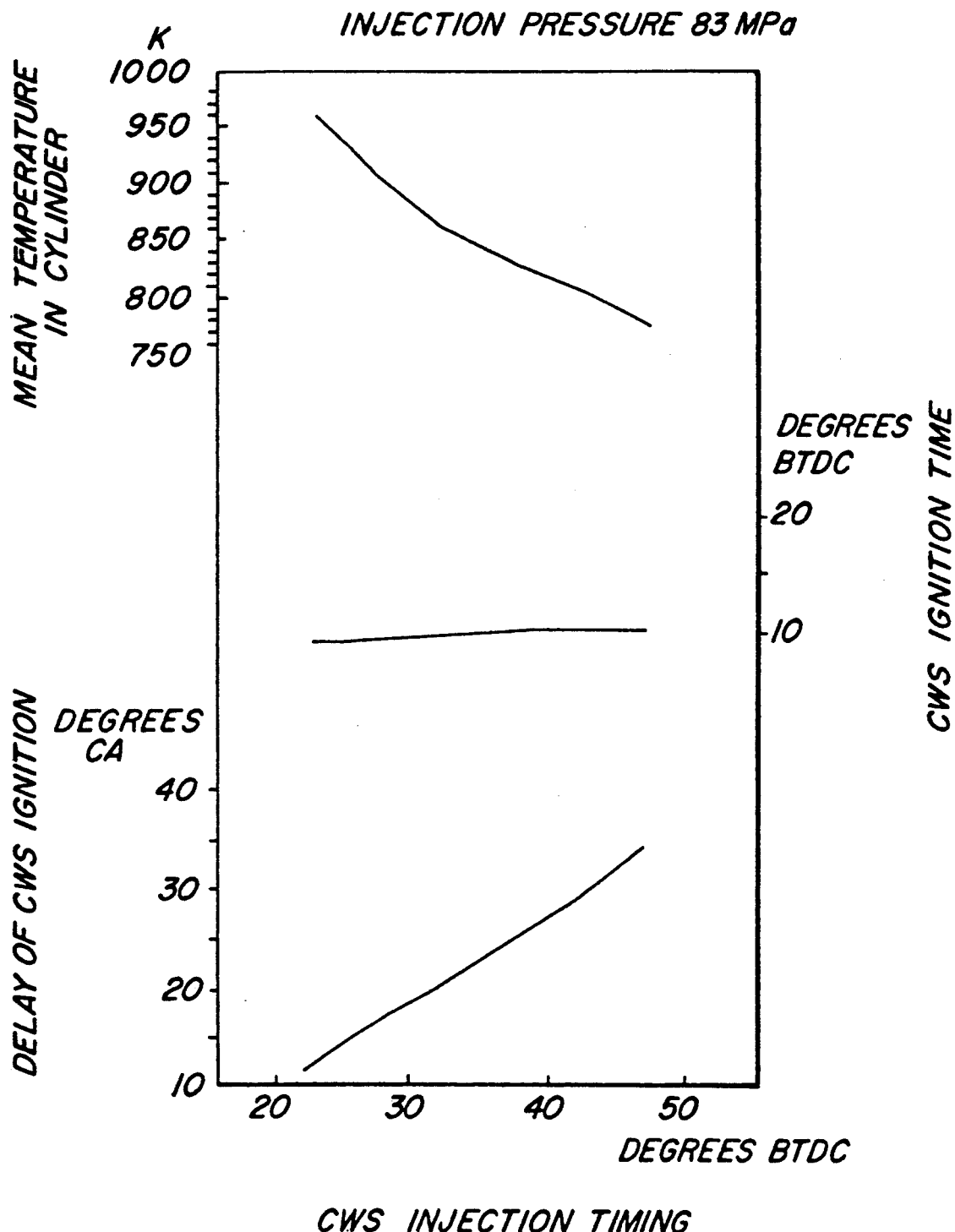
FIG. 4 is a chart showing the results of CWS fuel self ignition delay timing studies.

Since CWS self ignition is the limit of "Delayed Ignition", a further study was conducted to investigate ways to increase the self ignition delay of CWS fuel. One obvious way is to advance the injection timing of CWS fuel. Test runs were made by retarding the pilot injection timing beyond the self ignition of CWS fuel. The results of these tests are shown in FIG. 4. Clearly, ignition delay increases as CWS injection timing is advanced (lowest curve). This is evidently due to lower mean in-cylinder compression temperature which the CWS experiences during the delay period. The mean in-cylinder temperature for the cases studied is shown on the upper curve. Interestingly, the actual ignition time in terms of crank angle position did not change much as shown by the middle curve.

Figure 5:
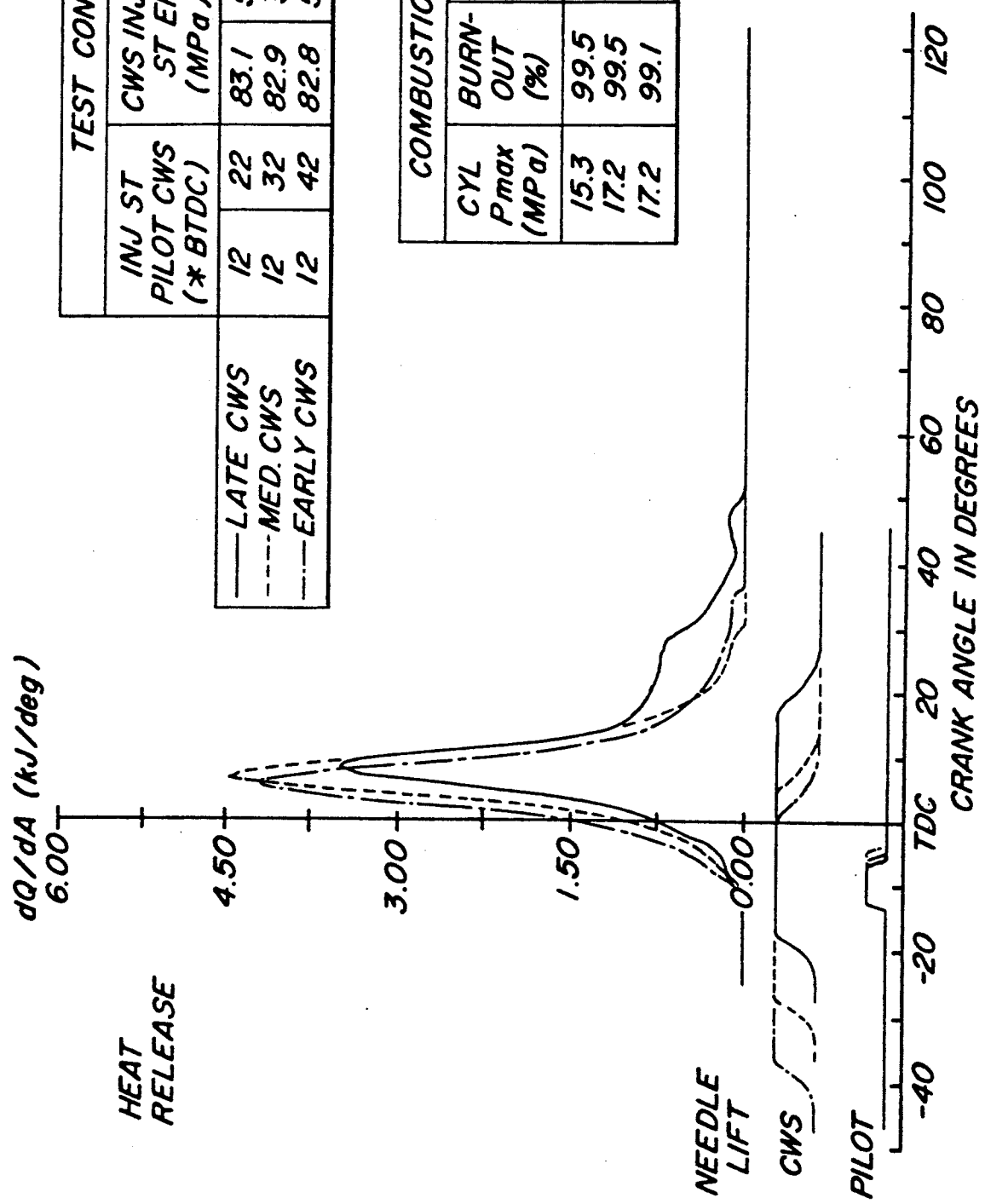
FIG. 5 is a chart showing CWS fuel impingement effect on combustion.

However, test results showed overly advanced injection timing, although providing very long delay, also deteriorated combustion and engine performance. The combustion analysis of the test cases are shown in FIG. 5. From the combustion results table in the lower right side of this figure, comparing the 1st (22 deg CWS inj., run #31) and the 2nd (32 deg CWS inj., run #33) case, SFC is clearly in favor of run #33 which had the longer delayed ignition. The combustion efficiency of the two are the same, while the Pmax of run #31 is much lower. This is because of the much lower heat release rate (solid line) due to short "Delayed Ignition". This trend did not hold true for further advancing the CWS injection timing from 32 deg BTDC to 42 deg, as shown by the third case (run #39, center line). For this last run, although Pmax remained the same, the combustion efficiency and SFC started to deteriorate (from 99.5% to 99.1% and from 8054 to 8876 kJ/kWh respectively). Further advancement of CWS injection timing to 47 deg BTDC (not shown in the figure) had drastically caused the combustion efficiency to drop to 98% and SFC to increase to over 9100 kJ/kWh.

Figure 6:
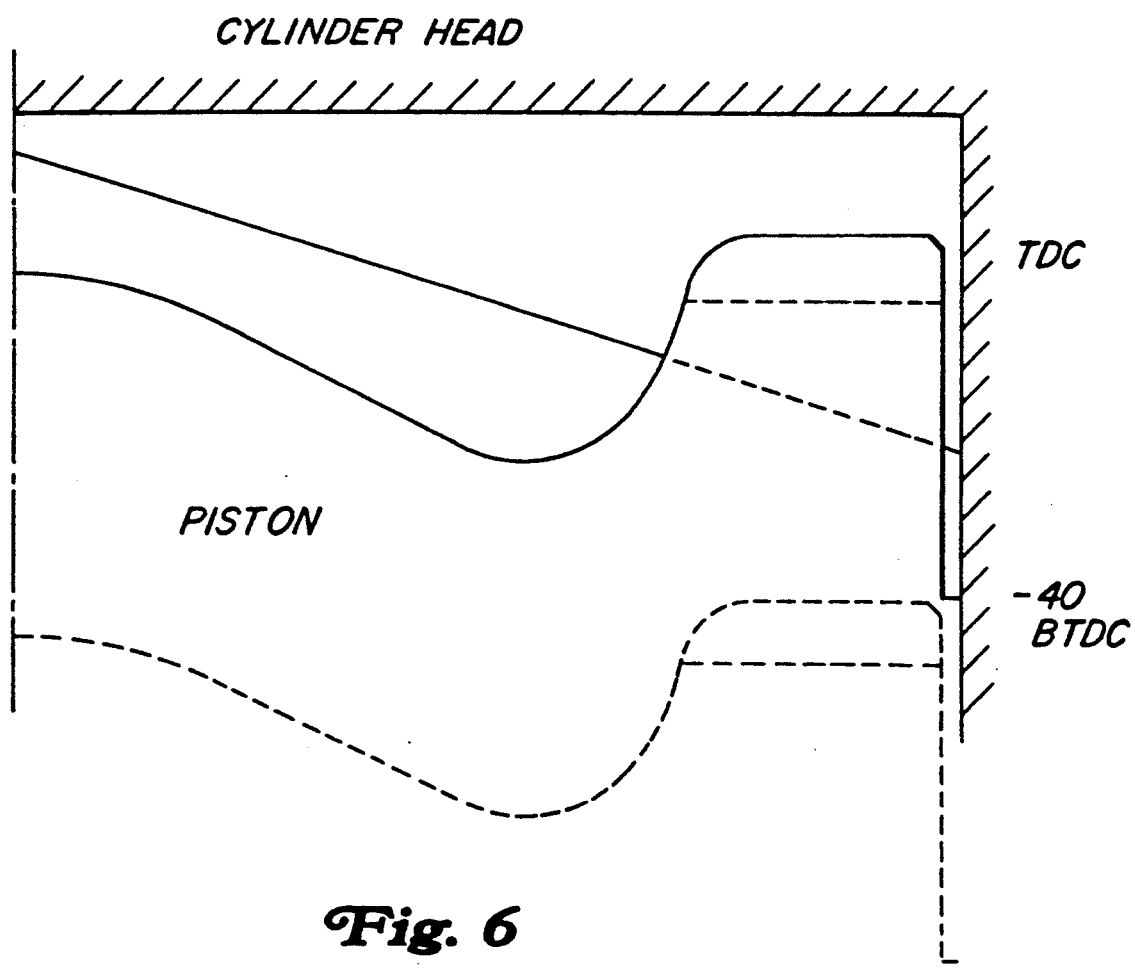
FIG. 6 is a schematic of injection timing and CWS impingement.

The reason for the combustion deterioration cannot find explanation in the normal pure diesel fuel operation experience. Overly advanced injection timing in diesel fuel operation brings BTDC early combustion, which leads to high Pmax, diesel knock (long ignition delay), and bad SFC. In the coal fuel engine case, no overly early combustion is detected. By reviewing the data of a separate CWS fuel injection study included in the present contract [Caton, 1991], it is highly probable that the CWS fuel spray has reached the cold cylinder liner walls by the time of ignition for the very early injection timing case. This is illustratively shown in FIG. 6. Further analysis had shown that, even with the 32 deg injection case, CWS fuel spray should have hit the piston crown after less than 5 degree crank angle. The CWS was not ignited until at least 20 crank angle degrees later (about 10 deg BTDC). Therefore, piston crown impingement happened well before ignition. Probably the crown temperature was high enough not to deteriorate the overall vaporization and subsequent combustion. Inspection of piston crown after engine dismantling had shown definite impingement marks. A major difference in the combustion of CWS and pure diesel fuel in the engine may be that for the CWS case, fuel spray impingement is not only unavoidable, but, in fact is necessary (for "Delayed Ignition").

Fuel injection timing maps for full engine load operations have been generated for Pmax, combustion efficiency, and SFC, as shown in FIG. 7. They are made by generating isometric lines using actual test results (triangles in the figure). For all the three indicators, in the full load usable range, pilot fuel injection timing seems not to have a major effect. This is probably due to the fact that, the combustion in the engine cylinder is mostly initiated by coal fuel self ignition. At about 37 deg BTDC CWS injection timing, maximum Pmax can be expected with each pilot fuel injection timing. The later the pilot fuel is introduced, the smaller its contribution to raising Pmax due to ATDC combustion. Introducing the CWS fuel before 37 deg BTDC (towards the right in the map), Pmax is reduced because of fuel spray cylinder liner impingement hindering heat release rate. CWS fuel "Delayed Ignition" effect again can be seen in the part where injection is after 37 deg BTDC (towards the left). The same explanation can be given to the combustion efficiency and SFC part of the map. However, the optimum CWS injection timing for these two indicators are not the same. This is probably because the optimum combustion efficiency depends mainly on the cylinder temperature, whereas the SFC depends on the concentration of heat release about TDC ("Relative Cycle Efficiency") and the combustion efficiency. Using this map, the injection timings of pilot and CWS fuel can be selected with the compromise needed for Pmax, combustion efficiency, and SFC. In the present case, the pilot timing is 12 and the CWS timing is 35 deg BTDC.

Figure 8:
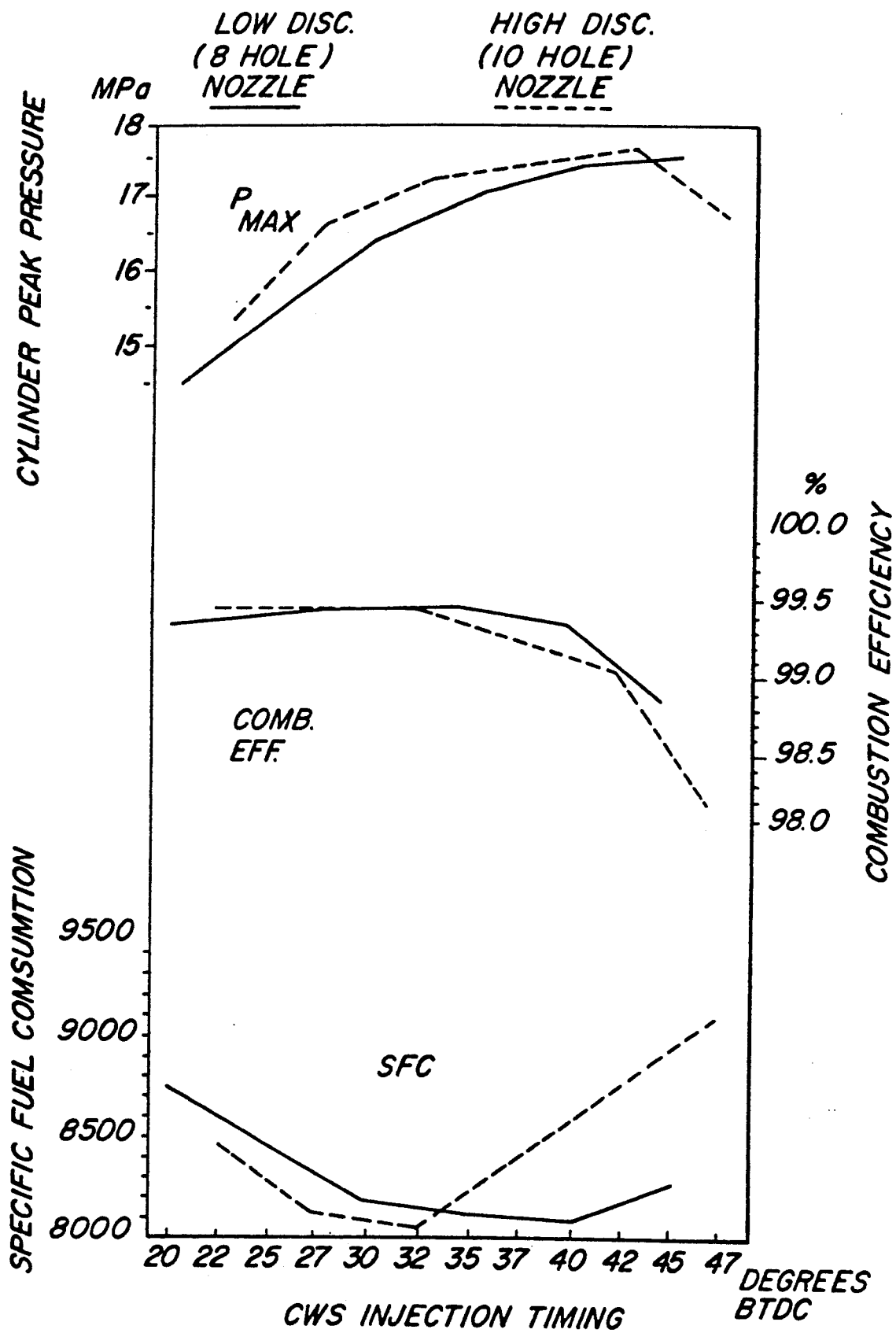
FIG. 8 is a chart showing the effect of injector hole discharge coefficients.

The first investigation on combustion chamber configuration was to compare a 10 hole (0.40 mm dia.) CWS injector nozzle with an 8 hole (0.46 mm dia.) having the same total flow area. The combustion indicators are summarized in FIG. 8. It is seen that, both the injectors can have the same maximum Pmax value, same highest combustion efficiency, and lowest SFC. Only, they happened at different CWS injection timings. Normal pure diesel fuel operation experience would suggest the better "air utilization" of the 10 hole injector nozzle should indicate some advantage. Further investigation into the fuel injection rate of the nozzles had shown that due to the hole size discrepancy, the hole discharge coefficients were different (0.88 for the 0.40 mm hole and 0.80 for the 0.46 mm hole). Since they were injected with the same injection pressure of 82.7 MPa, the spray exit velocity from injector hole for the former was 333 m/s, and the latter, 300 m/s. The higher exit velocity 10 hole nozzle would hit the cylinder liner wall at a smaller injection advance angle making its optimum value move correspondingly. This explanation suggests that for the two injectors tested, the initial air entrainment of the spray jet (hole number dependent) is not as important as the secondary atomization after spray impingement (depending on spray velocity) on the piston crown. Similar tests were done with different injector hole shapes. They included inverse trumpeted hole, rounded inner edged hole etc. Both 8 and 10 hole nozzles of different shapes were made. All of them seemed to suggest the same conclusion of spray velocity having the dominant effect. Based on these results, the 8 hole nozzle was selected for prototype due to much less tendency to hole plugging.

Figure 9:
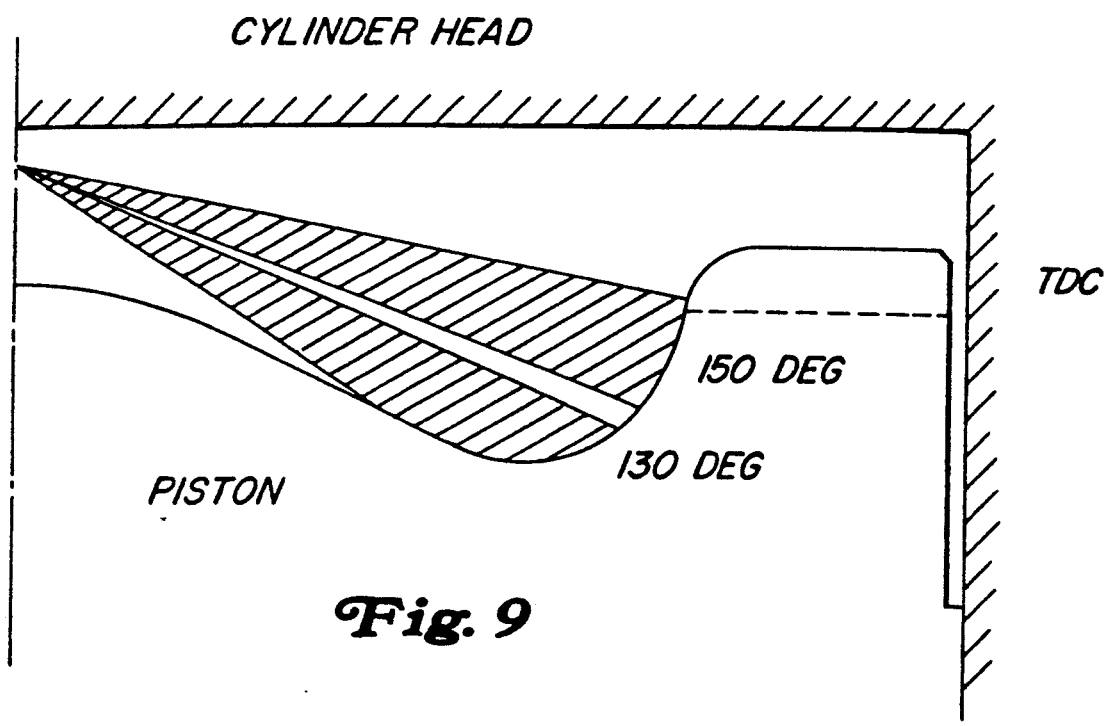
FIG. 9 is a schematic of spray included angle and impingement.
Figure 10:
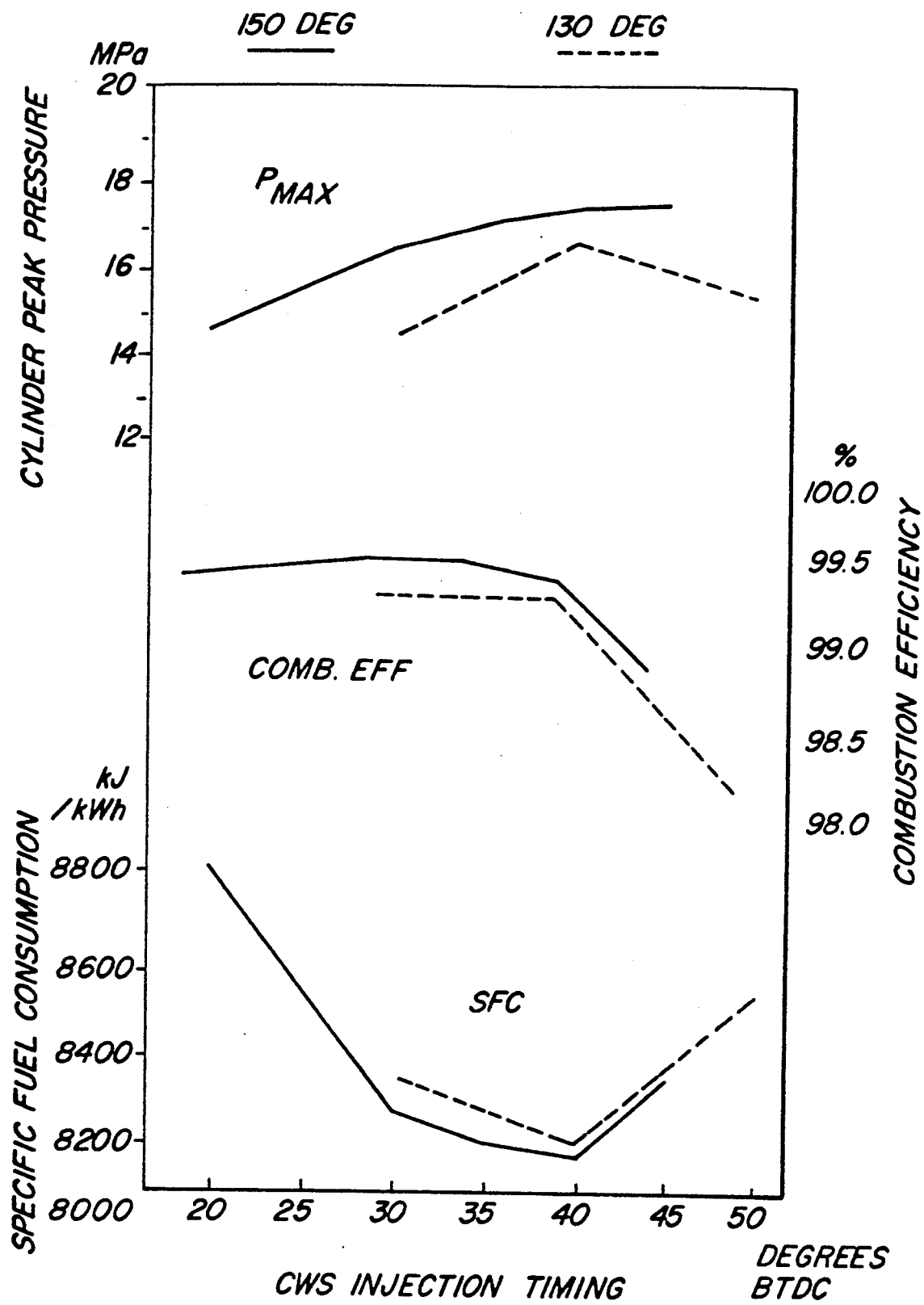
FIG. 10 is a chart showing the effect of injection spray timing, including the angle.

An 8 hole nozzle with smaller spray included angle of 130 degrees (as compared to the original 150 degrees) was tested to avoid cylinder liner impingement of CWS spray. It is schematically shown in FIG. 9. Test results as compared with the original are shown in FIG. 10. It can be seen that the firing pressure was lower and the combustion efficiency never reached the previous level, although the SFC was close. However the fact that the combustion efficiency decreased was not acceptable to the combustion design. This may imply that too much attachment of the impinged CWS on the piston crown is unfavorable also. More work has to be conducted in the future to optimize CWS impingement in the combustion chamber.

Figure 11:
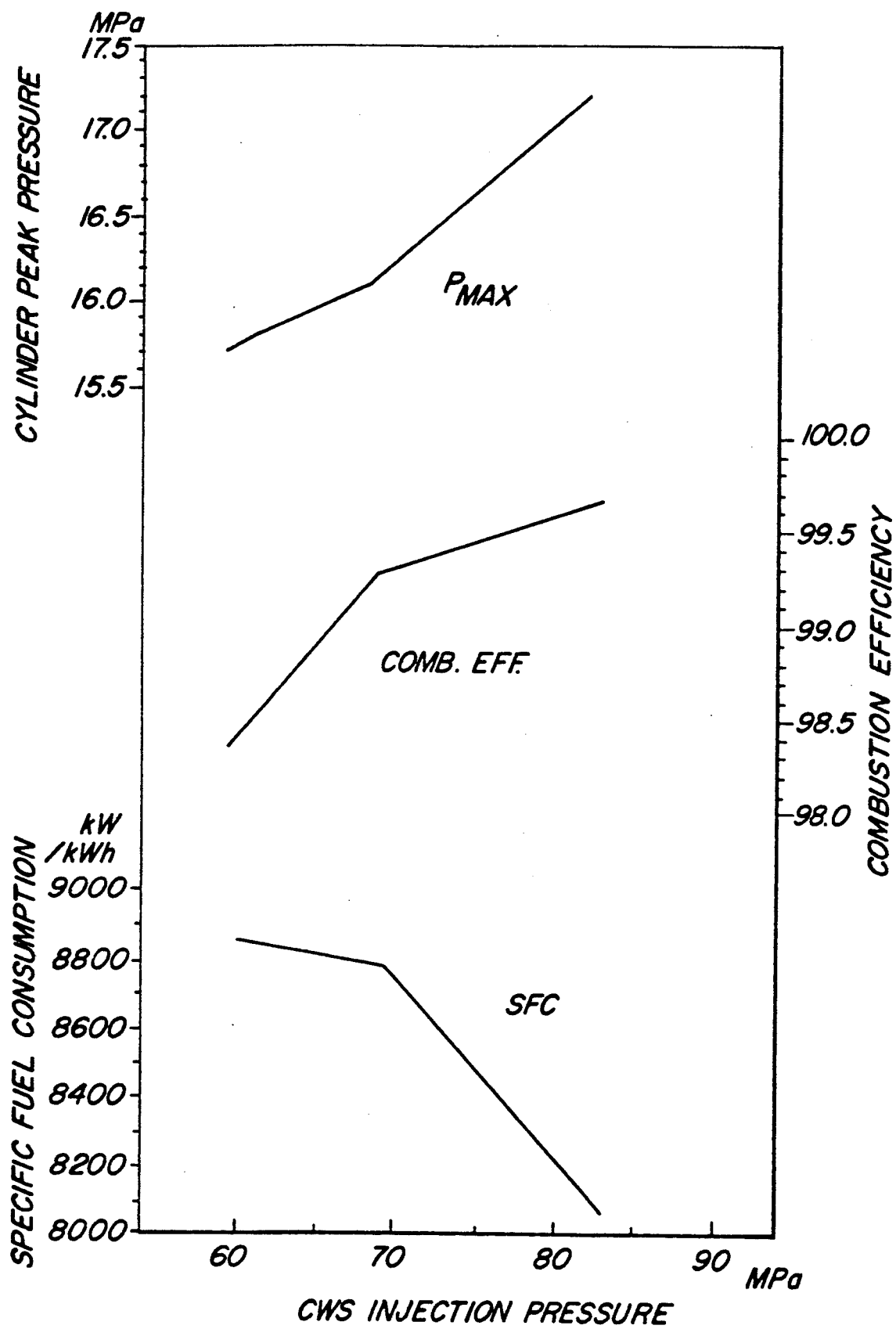
FIG. 11 is a chart showing the performance effect of CWS injection pressure.
Figure 12:
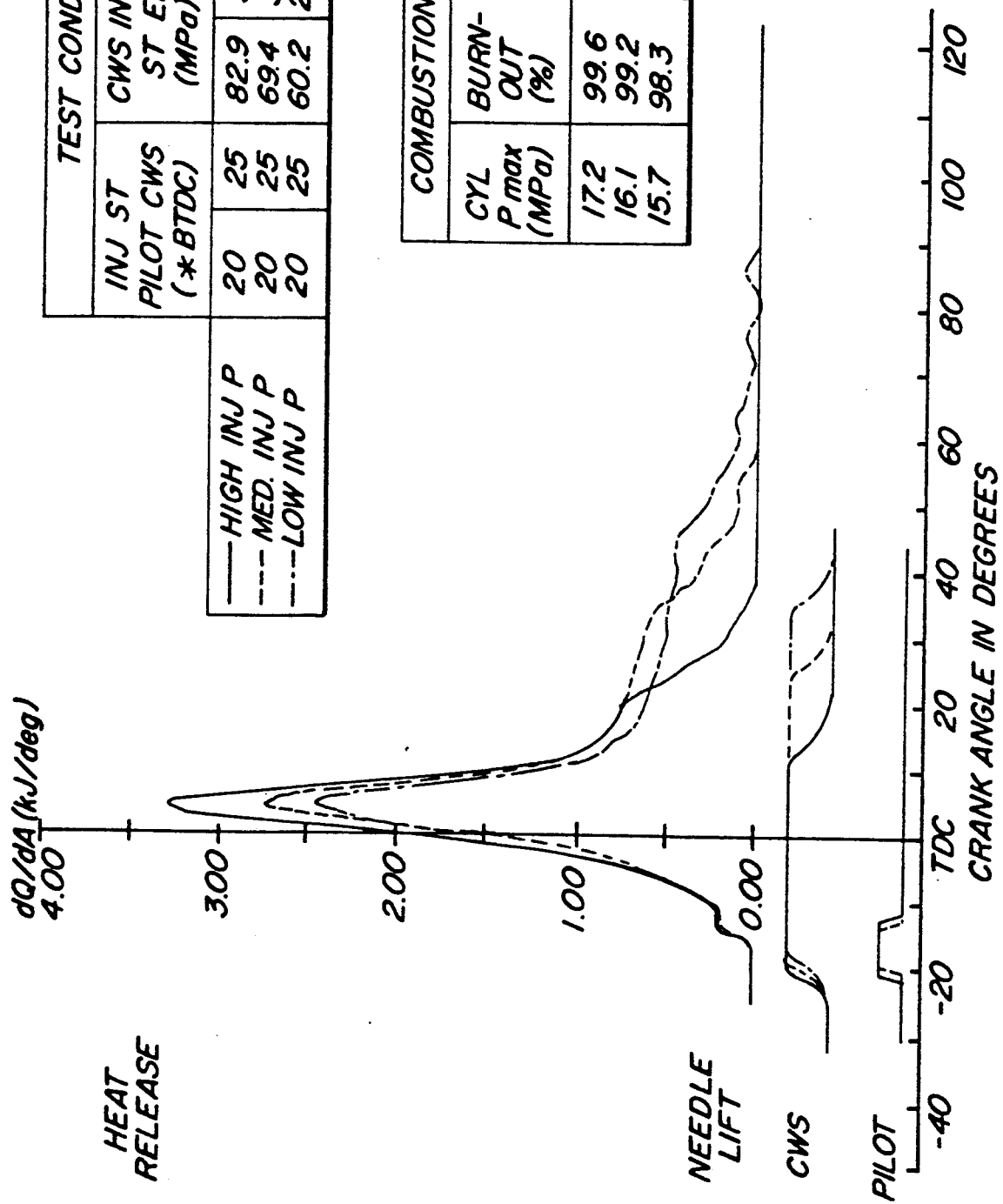
FIG. 12 is a chart showing the combustion effect of CWS injection pressure.

An investigation into CWS injection pressure was conducted early in the combustion study. The injection pressure varied between 61 to 83 MPa. The Pmax, combustion efficiency, and SFC results are compared in FIG. 11. Pmax and combustion efficiency are seen to increase with CWS injection pressure, while SFC decreases. Within the tested range, combustion performance definitely improved when higher injection pressure was used. The calculated heat release traces together with the cylinder pressure and the injector needle lift of the three runs are shown in FIG. 12. The highest heat release rate of the highest injection pressure case is evident. The injection starting times was the same (25 deg BTDC) and the CWS fuel was ignited at about the same time (10 deg BTDC). The higher heat release rate after ignition started is both the result of better atomization and more fuel being injected into the cylinder at the same instant. It is interesting to note that from the CWS ignition to the fall off of the peak heat release, there seems to be a fairly constant duration of 35 to 40 degrees crank angle. If the injection duration extends beyond the fall off period, then a hump, mentioned first by Hsu [1989], of rather slow heat release rate appears towards the end of the combustion period. It is in proportion to the extension of fuel injection duration beyond the 35 to 40 degrees crank angle period.

Figure 13:
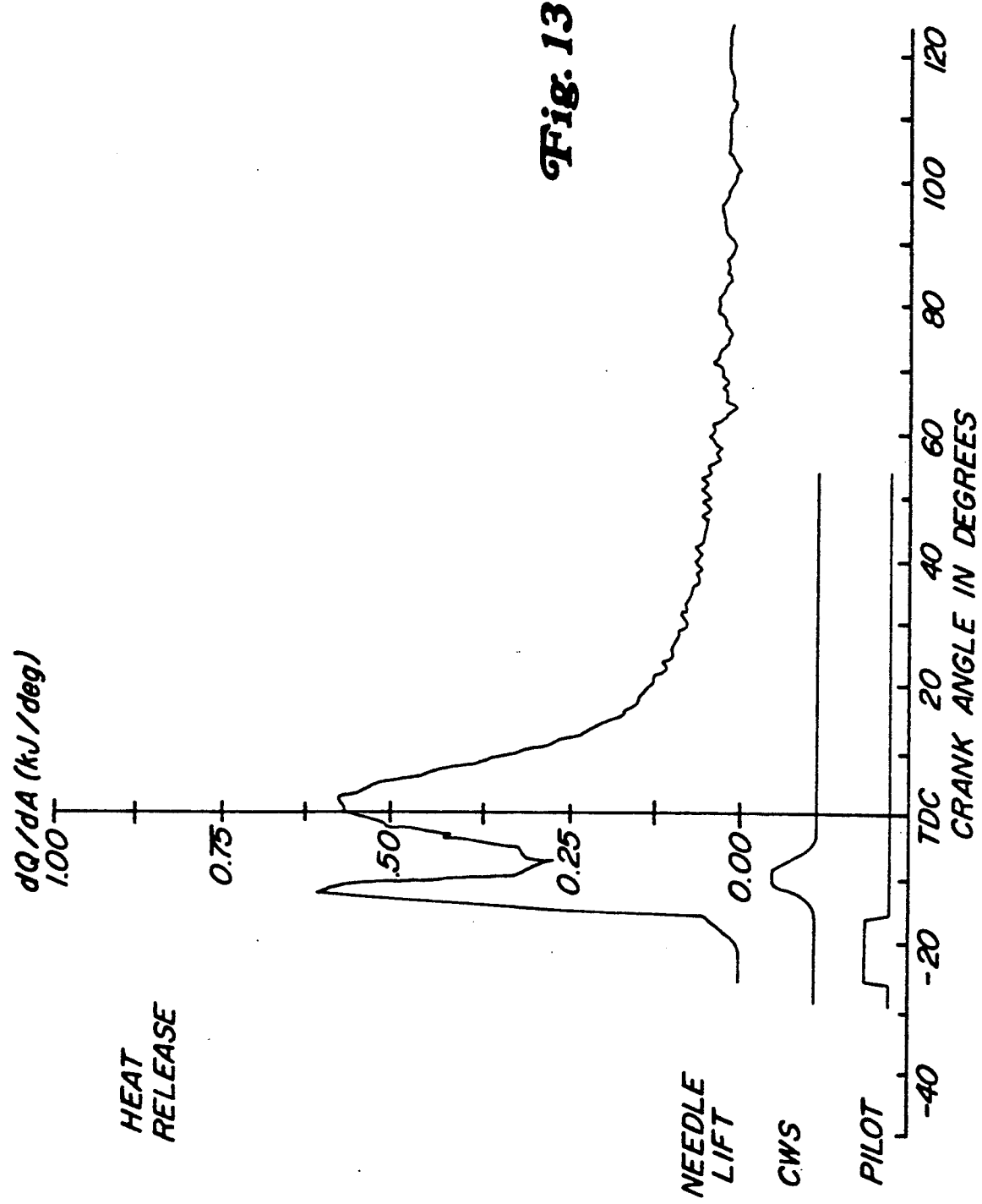
FIG. 13 is a chart showing engine combustion at low engine load.

Lower load operation is characterized by very low or no boost pressure in the inlet air manifold. As explained previously [Hsu, 1988a], it is not possible to self ignite the CWS due to the excessive temperature drop after heat is extracted to vaporize the water in fuel. Pilot diesel fuel combustion heat is necessary to raise the temperature early in the cycle for water evaporation. A typical combustion heat release pattern of the notch 2 load (naturally aspirated, 536 rpm, 300 kPa BMEP) is shown in FIG. 13. The first triangular heat release shape corresponds to the pilot diesel fuel combustion, which amounts to about 24% of energy as compared to about 4% at full engine load. The coal combustion efficiency was only about 93%, due to the low maximum combustion temperature of 1560K which is much lower than the 1900K at full engine load. The engine operation conditions and performance results at lower loads are summarized in Table 3.

Within the present program, a duty cycle coal usage percent target had been set for the study of overall economics of a coal fired locomotive. A typical locomotive operates about 60% of time at idle, which uses pure diesel fuel. Therefore, the target was set for 75% of coal energy consumption (25% diesel fuel) on a duty cycle basis. The above Table 3 type of operation can actually provide 80% coal usage, which exceeded the planned goal.

Figure 14:
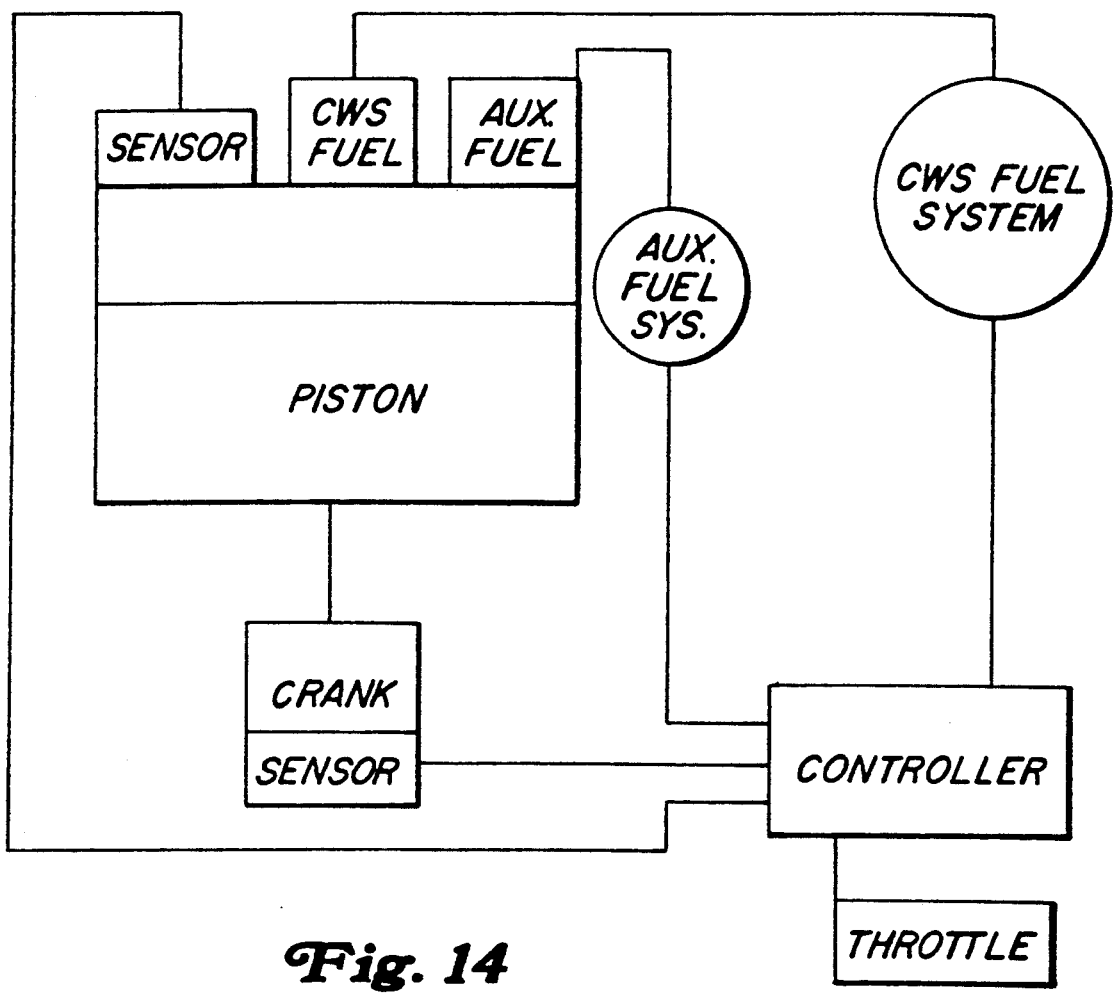
FIG. 14 is a block diagram showing the fuel injection system in accordance with this invention.
Figure 15:
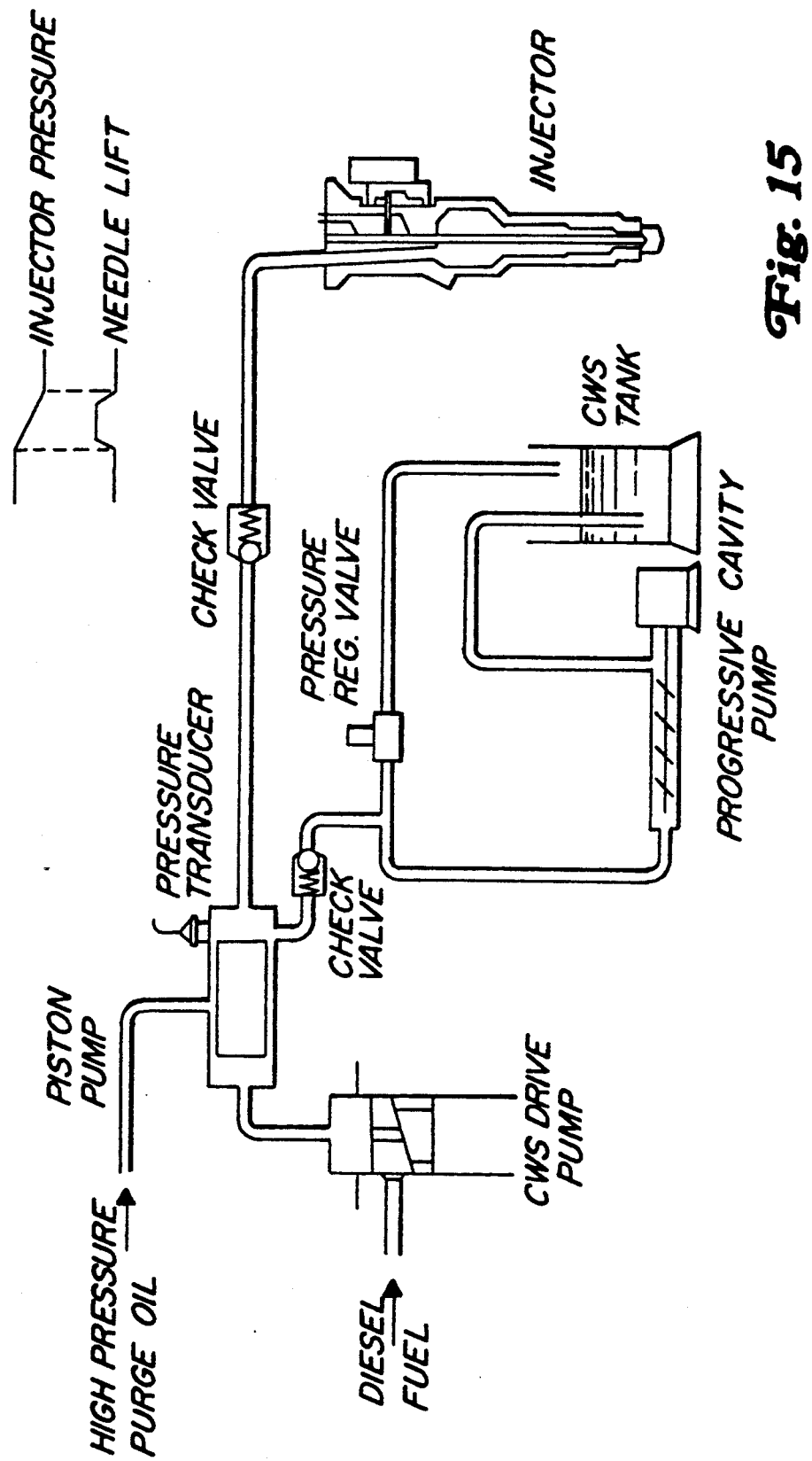
FIG. 15 is a block diagram of coal-water-slurry fueled diesel engine system fuel injection equipment.
Figure 18:
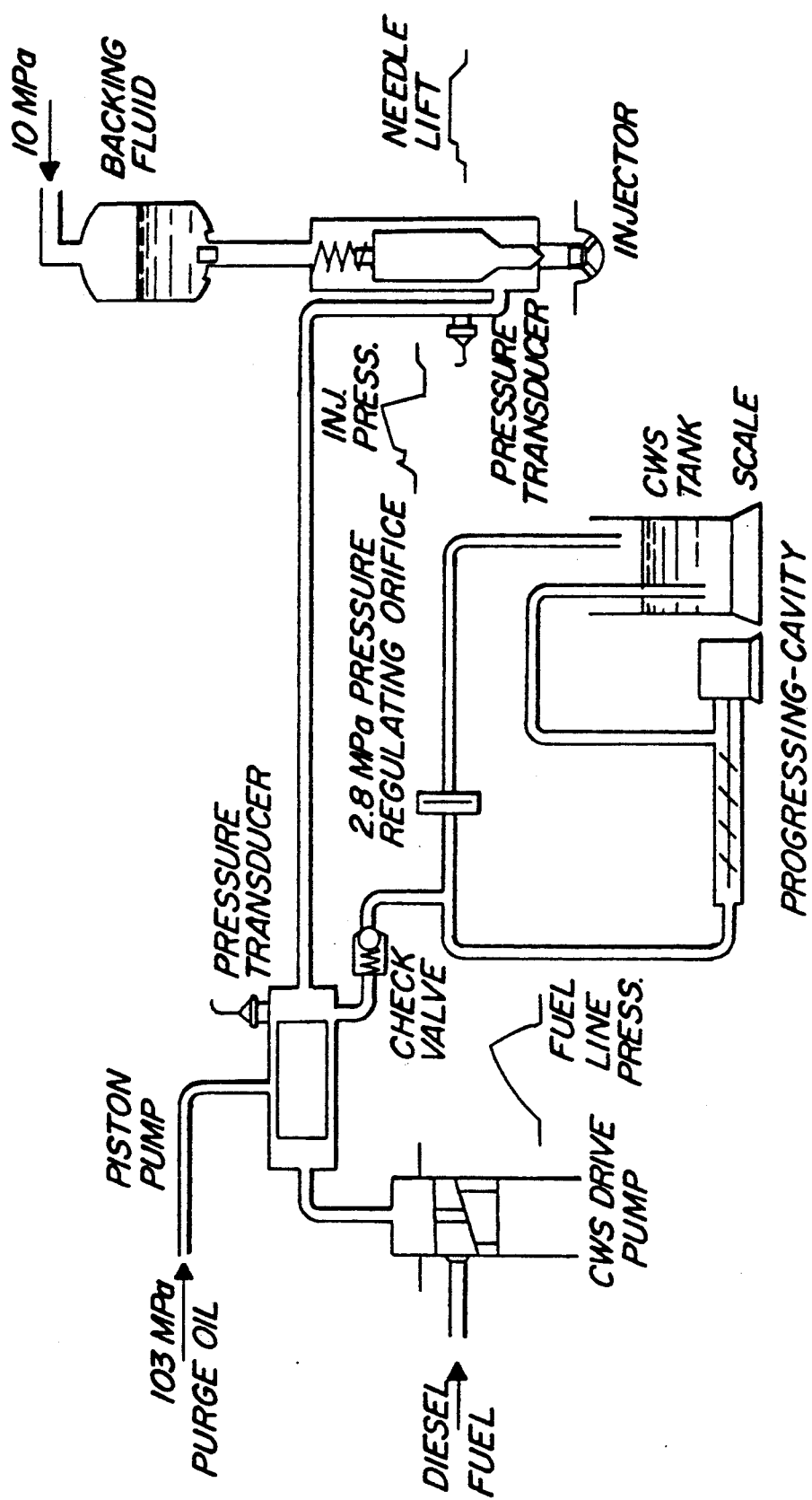
FIG. 18 is a block diagram of an example of fuel injection equipment for a 12 cylinder coal fueled diesel engine; and, FIG. 19 is a diagram of fuel injection controls for a 12 cylinder coal fueled diesel engine.

Apparatus for practicing this invention is shown in block diagram form in FIG. 14. An internal combustion engine, which may be a diesel engine, as depicted in FIG. 1. The cylinder has a combustion chamber defined by the space between the top of the piston head, the cylinder walls and the cylinder head. The cylinder is provided with two fuel injectors; one for the main fuel and the other for the auxiliary fuel. Each of those fuel injectors is operatively connected to fuel injection systems. Fuel injection systems for the auxiliary fuel, which may be diesel fuel, are well known in the art. Fuel injection systems for the CWS fuel are shown diagrammatically in FIGS. 15 and 18.

Figure 16:
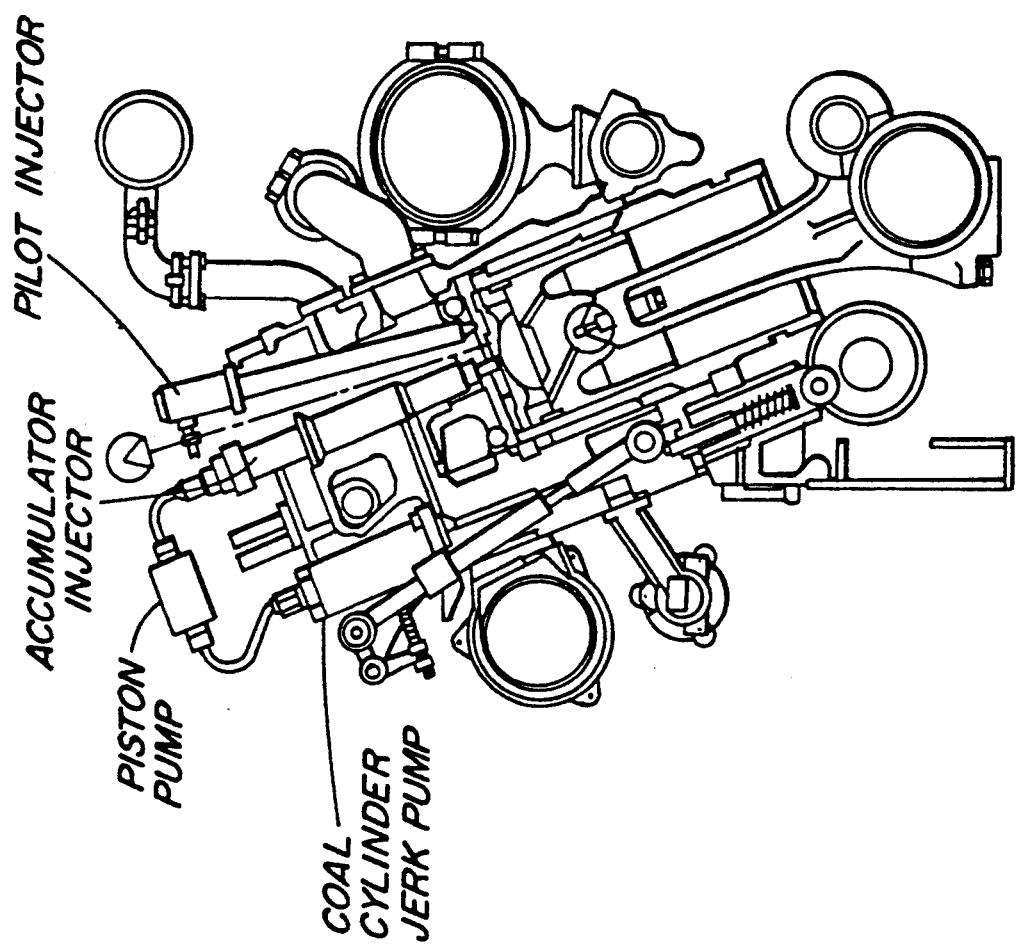
FIG. 16 is a diagram of one example of a coal fueled engine layout.

Sensor means, which may be pressure transducers, temperature sensors, and/or engine crank angle encoders are provided in communication with the combustion chambers, and/or the crank, and/or the linkage of the engine, and/or the throttle. Control means, which may be a computer or any microprocessor driven device, are in communication with such sensor or sensors. The control means are operatively in communication with the fuel injection systems, and control those systems in response to the throttle input. The general layout of the engines is shown in FIGS. 16, 17 and 19.

I claim:

1. A method of introducing a low combustible main fuel and a high combustible auxiliary fuel into in an internal combustion engine having at least one cylinder having a combustion chamber, the method comprising:
    injecting the auxiliary fuel to start and to run the engine at idle until the engine achieves normal operating conditions; and
    detecting the load conditions on the engine; and,
        at minimum load conditions, introducing the auxiliary fuel into the combustion chamber as a pilot fuel prior to introducing the main fuel into the combustion chamber;
        at midrange load conditions, determining the amount of time required for a predetermined

TABLE 3

| | | Engine Operation Conditions and Results | | | | | | |
|---|---|---|---|---|---|---|---|---|
| | | Operation Conditions | | | | Combustion Results | | |
| | | MEP | Inj. Tim. BTDC | | Fuel Amt Percent | | Pmax | Comb. | SFC |
| Load | RPM | MPa | Pilot | CWS | Pilot | CWS | MPa | Eff. % | kJ/kWh |
| N2 | 620 | 0.30 | 24 | 15 | 23.8 | 76.2 | 4.9 | 92.8 | 12165 |
| N3 | 880 | 0.49 | 23 | 15 | 23.9 | 76.1 | 5.5 | 94.9 | 10450 |
| N4 | 880 | 0.56 | 22 | 15 | 16.9 | 83.1 | 5.9 | 96.5 | 9255 |
| N5 | 960 | 1.03 | 20 | 20 | 9.2 | 90.8 | 8.2 | 97.5 | 8560 |
| N6 | 960 | 1.35 | 19 | 20 | 6.7 | 93.3 | 9.9 | 98.5 | 8258 |
| N7 | 960 | 1.71 | 18 | 25 | 5.0 | 95,0 | 12.3 | 99.0 | 8403 |
| N8 | 1050 | 1.98 | 12 | 35 | 4.0 | 96.0 | 17.1 | 99.5 | 8159 |

It is most interesting to note that when engine load increases, the optimum injection timing of the pilot fuel is retarded while that of CWS fuel is advanced. As anticipated, the pilot fuel amount needed becomes less when engine load is increased. The combustion efficiency increases with the engine load probably due to higher combustion and piston crown temperature.

amount of evaporation and devolatilization of the main fuel under the load conditions; introducing the main fuel into the combustion chamber sufficiently prior to the top dead center position of the piston to achieve the predetermined amount of evaporation and devolatilization; and, delaying the introduction of the auxiliary fuel into the combustion chamber relative to the introduction at minimum load conditions for a predetermined amount of time so that the main fuel can be ignited and burn very fast to yield a predetermined high combustion rate and efficiency; and at maximum load conditions, determining the amount of time required for a predetermined amount of evaporation and devolatilization of the main fuel; introducing the main fuel sufficiently prior to the top dead center position of the piston to achieve the predetermined amount of evaporation and devolatilization; and delaying the introduction of the auxiliary fuel into the combustion chamber until a predetermined amount of time after introduction of the main fuel has occurred so that the main fuel has evaporated and so that the main fuel will burn very fast to yield a predetermined high combustion rate and efficiency at a predetermined maximum cylinder pressure.

2. The method of claim 1 wherein the low combustible main fuel is a coal water slurry.

3. The method of claim 2 wherein the high combustible auxiliary fuel is diesel oil.

4. A method of introducing a low combustible main fuel and a high combustible auxiliary fuel into an internal combustion engine having at least one cylinder having a combustion chamber, the method comprising:

injecting the auxiliary fuel to start the engine and to run the engine at idle until the engine achieves normal operating conditions;

detecting the load conditions on the engine;

at minimum load conditions, introducing the auxiliary fuel into the combustion chamber as a pilot fuel prior to introducing the main fuel into the combustion chamber; and at midrange load conditions, determining the amount of time required for a predetermined amount of evaporation and devolatilization of the main fuel under the load conditions; introducing the main fuel into the combustion chamber sufficiently prior to the top dead center position of the piston to achieve the predetermined amount of evaporation and devolatilization; and delaying the introduction of the auxiliary fuel into the combustion chamber relative to the introduction at minimum load conditions for a predetermined amount of time so that the main fuel can be ignited and burn very fast to yield a predetermined high combustion rate and efficiency.

5. The method of claim 4 wherein the low combustible main fuel is a coal water slurry.

6. The method of claim 5 wherein the high combustible auxiliary fuel is diesel oil.

7. A method of introducing a low combustible main fuel and a high combustible auxiliary fuel into an internal combustion engine having at least one cylinder having a combustion chamber, the method comprising:

injecting the auxiliary fuel to start the engine and to run the engine at idle until the engine achieves normal operating conditions;

detecting the load conditions on the engine; and at midrange load conditions, determining the amount of time required for a predetermined amount of evaporation and devolatilization of the main fuel under the load conditions; introducing the main fuel into the combustion chamber sufficiently prior to the top dead center position of the piston to achieve the predetermined amount of evaporation and devolatilization; and delaying the introduction of the auxiliary fuel into the combustion chamber relative to the introduction at minimum load conditions for a predetermined amount of time so that the main fuel can be ignited and burn very fast to yield a predetermined high combustion rate and efficiency.

8. The method of claim 7 wherein the low combustible main fuel is a coal water slurry.

9. The method of claim 8 wherein the high combustible auxiliary fuel is diesel oil.

10. A method of introducing a low combustible main fuel and a high combustible auxiliary fuel into an internal combustion engine having at least one cylinder having a combustion chamber, the method comprising:

injecting the auxiliary fuel to start the engine and to run the engine at idle until the engine achieves normal operating conditions;

detecting the load conditions on the engine; and at maximum load conditions, determining the amount of time required for a predetermined amount of evaporation and devolatilization of the main fuel; introducing the main fuel sufficiently prior to the top dead center position of the piston to achieve the predetermined amount of evaporation and devolatilization; and delaying the introduction of the auxiliary fuel into the combustion chamber until a predetermined amount of time after introduction of the main fuel has occurred so that the main fuel has evaporated and so that the main fuel will burn very fast to yield a predetermined high combustion rate and efficiency at a predetermined maximum cylinder pressure.

11. The method of claim 10 wherein the low combustible main fuel is a coal water slurry.

12. The method of claim 11 wherein the high combustible auxiliary fuel is diesel oil.

13. The method of claim 11 wherein the coal water slurry comprises about 0.7% to about 2.5% ash by weight and about 46% to about 51% solid by weight.

14. A system for introducing a low combustible main fuel and a high combustible auxiliary fuel into in an internal combustion engine having at least one cylinder having a combustion chamber, the system comprising:

means for injecting the auxiliary fuel to start and to run the engine at idle until the engine achieves normal operating conditions; and means for detecting the load conditions on the engine;

means for introducing, at minimum load conditions, the auxiliary fuel into the combustion chamber as a pilot fuel prior to introducing the main fuel into the combustion chamber;

means for determining, at midrange load conditions, the amount of time required for a predetermined amount of evaporation and devolatilization of the main fuel under the load conditions;

means for introducing, at midrange load conditions, the main fuel into the combustion chamber sufficiently prior to the top dead center position of the piston to achieve the predetermined amount of evaporation and devolatilization;

means for delaying, at midrange load conditions, the introduction of the auxiliary fuel into the combustion chamber relative to the introduction at minimum load conditions for a predetermined amount of time so that the main fuel can be ignited and burn very fast to yield a predetermined high combustion rate and efficiency;

means for determining, at maximum load conditions, the amount of time required for a predetermined amount of evaporation and devolatilization of the main fuel;

means for introducing, at maximum load conditions, the main fuel sufficiently prior to the top dead center position of the piston to achieve the predetermined amount of evaporation and devolatilization; and means for delaying, at maximum load conditions, the introduction of the auxiliary fuel into the combustion chamber until a predetermined amount of time after introduction of the main fuel has occurred so that the main fuel has evaporated and so that the main fuel will burn very fast to yield a predetermined high combustion rate and efficiency at a predetermined maximum cylinder pressure.

15. The system of claim 14 wherein the low combustible main fuel is a coal water slurry.

16. The system of claim 15 wherein the high combustible auxiliary fuel is diesel oil.

17. A system of introducing a low combustible main fuel and a high combustible auxiliary fuel into in an internal combustion engine having at least one cylinder having a combustion chamber, the system comprising:

means for injecting the auxiliary fuel to start and to run the engine at idle until the engine achieves normal operating conditions;

means for detecting the load conditions on the engine;

means for determining, at midrange load conditions, the amount of time required for a predetermined amount of evaporation and devolatilization of the main fuel under the load conditions; and means for introducing, at midrange load conditions, the main fuel into the combustion chamber sufficiently prior to the top dead center position of the piston to achieve the predetermined amount of evaporation and devolatilization; and delaying the introduction of the auxiliary fuel into the combustion chamber relative to the introduction at minimum load conditions for a predetermined amount of time so that the main fuel can be ignited and burn very fast to yield a predetermined high combustion rate and efficiency.

18. The system of claim 17 wherein the low combustible main fuel is a coal water slurry.

19. The system of claim 18 wherein the high combustible auxiliary fuel is diesel oil.

20. A system of introducing a low combustible main fuel and a high combustible auxiliary fuel into in an internal combustion engine having at least one cylinder having a combustion chamber, the system comprising:

means for injecting the auxiliary fuel to start the locomotive and to run the engine at idle until the engine achieves normal operating conditions;

means for detecting the load conditions on the engine;

means for determining, at maximum load conditions, the amount of time required for a predetermined amount of evaporation and devolatilization of the main fuel;

means for introducing, at maximum load conditions, the main fuel sufficiently prior to the top dead center position of the piston to achieve the predetermined amount of evaporation and devolatilization; and means for delaying, at maximum load conditions, the introduction of the auxiliary fuel into the combustion chamber until a predetermined amount of time after introduction of the main fuel has occurred so that the main fuel has evaporated and so that the main fuel will burn very fast to yield a predetermined high combustion rate and efficiency at a predetermined maximum cylinder pressure.

21. The system of claim 20 wherein the low combustible main fuel is a coal water slurry.

22. The system of claim 21 wherein the high combustible auxiliary fuel is diesel oil.

23. The system of claim 21 wherein the coal water slurry comprises about 0.7% to about 2.5% ash by weight and about 46% to about 51% solid by weight.

* * * * *